US012634517B2

(12) United States Patent
Kuma et al.

(10) Patent No.: US 12,634,517 B2
(45) Date of Patent: May 19, 2026

(54) ENCODING APPARATUS AND METHOD FOR ENCODING A DIFFERENCE VALUE BETWEEN ATTRIBUTE DATA OF A PROCESSING TARGET AND A NEARBY POINT SET AS A REFERENCE POINT

(71) Applicant: Sony Group Corporation, Tokyo (JP)

(72) Inventors: Satoru Kuma, Tokyo (JP); Ohji Nakagami, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 458 days.

(21) Appl. No.: 18/265,387

(22) PCT Filed: Dec. 14, 2021

(86) PCT No.: PCT/JP2021/045929
§ 371 (c)(1),
(2) Date: Jun. 5, 2023

(87) PCT Pub. No.: WO2022/145214
PCT Pub. Date: Jul. 7, 2022

(65) Prior Publication Data
US 2024/0056604 A1     Feb. 15, 2024

(30) Foreign Application Priority Data
Dec. 28, 2020     (JP) ................................ 2020-218500

(51) Int. Cl.
*H04N 19/597*     (2014.01)
*G06T 7/60*     (2017.01)
(Continued)

(52) U.S. Cl.
CPC ............. *H04N 19/597* (2014.11); *G06T 7/60* (2013.01); *G06T 17/00* (2013.01); *H04N 19/96* (2014.11)

(58) Field of Classification Search
CPC ...... H04N 19/597; H04N 19/70; H04N 19/96; G06T 7/60; G06T 9/001; G06T 9/40; G06T 17/00
(Continued)

(56) References Cited

U.S. PATENT DOCUMENTS

| | | |
|---|---|---|
| 2019/0081638 A1 | 3/2019 | Mammou |
| 2020/0021844 A1 | 1/2020 | Yea |

(Continued)

FOREIGN PATENT DOCUMENTS

| | | |
|---|---|---|
| EP | 3944195 A1 | 1/2022 |
| WO | WO 2017/104115 A1 | 6/2017 |
| WO | WO-2020162495 A1 | 8/2020 |
| WO | WO 2020/189296 A1 | 9/2020 |
| WO | WO 2020/189709 A1 | 9/2020 |

OTHER PUBLICATIONS

"G-PCC codec description", 130. MPEG Meeting; Apr. 20, 2020-Apr. 24, 2020; Alpbach; (Motion Picture Expert Group or ISO/IEC JTC1/SC29/ WG11), No. n19331 Jun. 25, 2020 (Jun. 25, 2020), XP030289576.
(Continued)

*Primary Examiner* — Jacinta M Crawford
(74) *Attorney, Agent, or Firm* — Paratus Law Group, PLLC

(57)     ABSTRACT

There is provided an information processing apparatus and method that enable attribute data to be decoded more reliably. Nearby point search for setting a reference point to be referred to when deriving a prediction value of attribute data of a processing target node is executed only for a node that is decoded earlier than the processing target node at the time of decoding among nodes of a tree structure in which attribute data of each point of a point cloud expressing an object having a three-dimensional shape as a set of points is a node and slices serving as node groups that can be encoded
(Continued)

START OF ENCODING PROCESSING

ENCODE GEOMETRY DATA     S101

DECODE GEOMETRY DATA     S102

PERFORM RECOLORING PROCESSING USING DECODING RESULT     S103

ENCODE ATTRIBUTE DATA     S104

GENERATE BITSTREAM     S105

END independently of each other are formed. The present disclosure can be applied to, for example, an information processing apparatus, an encoding apparatus, a decoding apparatus, an electronic device, an information processing method, or a program.

8 Claims, 24 Drawing Sheets

(51) Int. Cl.
*G06T 17/00*         (2006.01)
*H04N 19/96*         (2014.01)

(58) Field of Classification Search
USPC ........................................................ 345/420
See application file for complete search history.

(56)               References Cited

U.S. PATENT DOCUMENTS

2020/0304829 A1    9/2020   Yea
2021/0227259 A1*   7/2021   Sugio ................... H04N 19/463

OTHER PUBLICATIONS

Flynn et al., G-PCC: A hierarchical geometry slice structure, International Organization for Standardization ISO/IEC JTC1/SC29/WG11, Apr. 2020, pp. 1-9, Online.
Mammou et al., Lifting Scheme for Lossy Attribute Encoding in TMC1, International Organization for Standardization ISO/IEC JTC1/SC29/WG11, Apr. 2018, pp. 1-9, San Diego.
Mekuria et al., Design, Implementation, and Evaluation of a Point Cloud Codec for Tele-Immersive Video, IEEE Transactions on Circuit and Systems for Video Technology, Apr. 2017, pp. 828-842, vol. 27, No. 4.

* cited by examiner

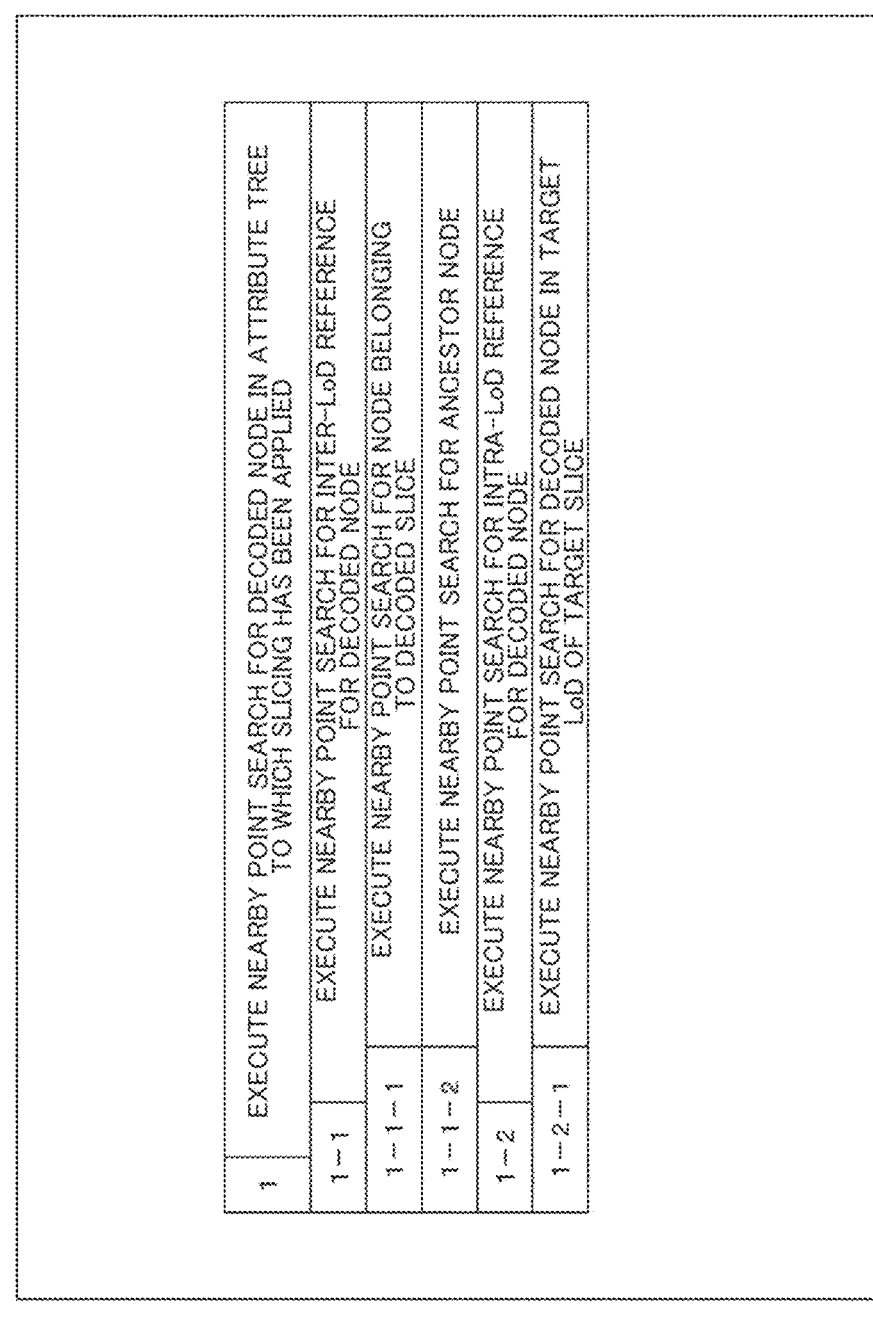

Fig. 5

| | |
|---|---|
| 1 | EXECUTE NEARBY POINT SEARCH FOR DECODED NODE IN ATTRIBUTE TREE TO WHICH SLICING HAS BEEN APPLIED |
| 1-1 | EXECUTE NEARBY POINT SEARCH FOR INTER-LoD REFERENCE FOR DECODED NODE |
| 1-1-1 | EXECUTE NEARBY POINT SEARCH FOR NODE BELONGING TO DECODED SLICE |
| 1-1-2 | EXECUTE NEARBY POINT SEARCH FOR ANCESTOR NODE |
| 1-2 | EXECUTE NEARBY POINT SEARCH FOR INTRA-LoD REFERENCE FOR DECODED NODE |
| 1-2-1 | EXECUTE NEARBY POINT SEARCH FOR DECODED NODE IN TARGET LoD OF TARGET SLICE |

Fig. 11

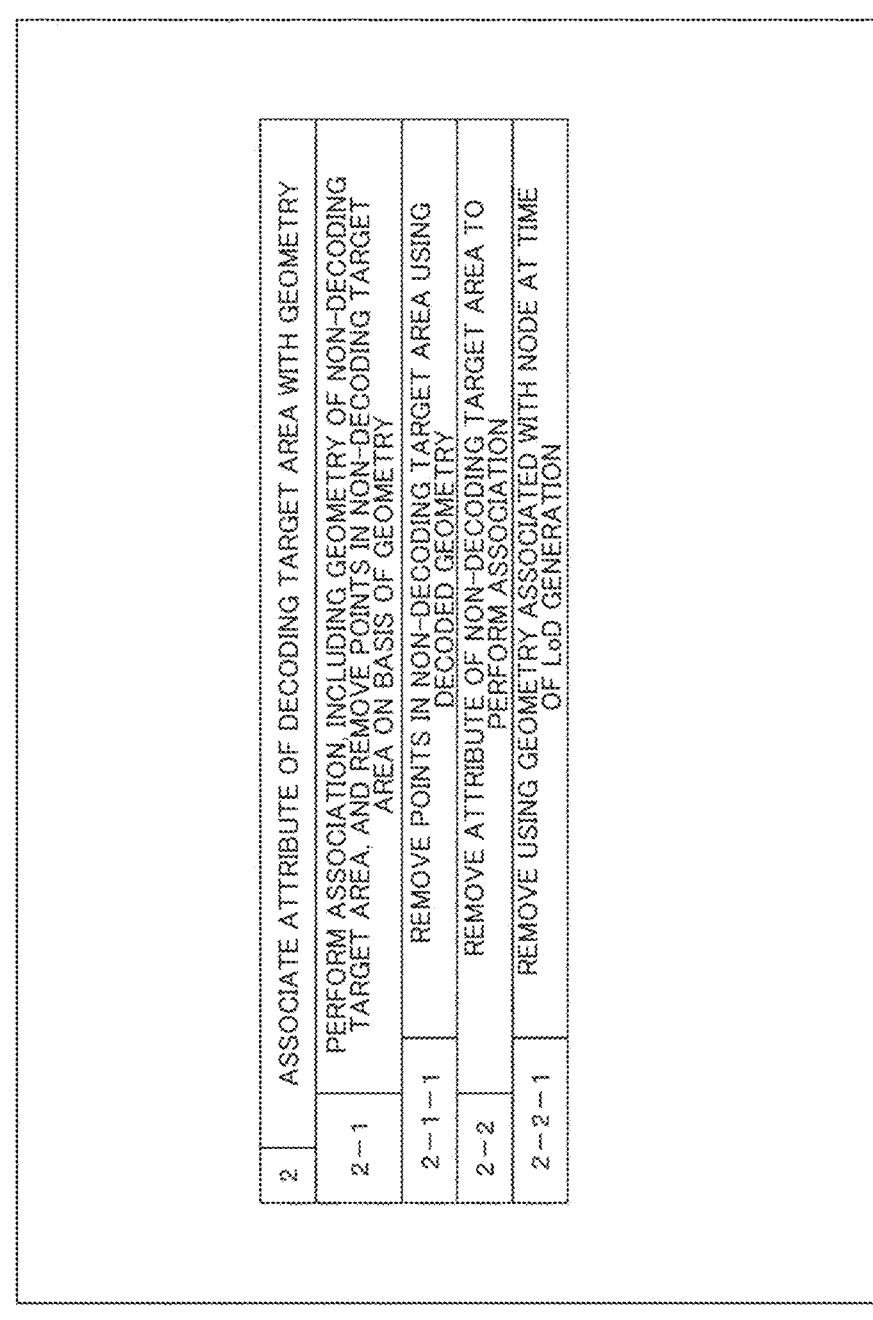

| 2 | ASSOCIATE ATTRIBUTE OF DECODING TARGET AREA WITH GEOMETRY |
|---|---|
| 2-1 | PERFORM ASSOCIATION, INCLUDING GEOMETRY OF NON-DECODING TARGET AREA, AND REMOVE POINTS IN NON-DECODING TARGET AREA ON BASIS OF GEOMETRY |
| 2-1-1 | REMOVE POINTS IN NON-DECODING TARGET AREA USING DECODED GEOMETRY |
| 2-2 | REMOVE ATTRIBUTE OF NON-DECODING TARGET AREA TO PERFORM ASSOCIATION |
| 2-2-1 | REMOVE USING GEOMETRY ASSOCIATED WITH NODE AT TIME OF LoD GENERATION |

Fig. 21

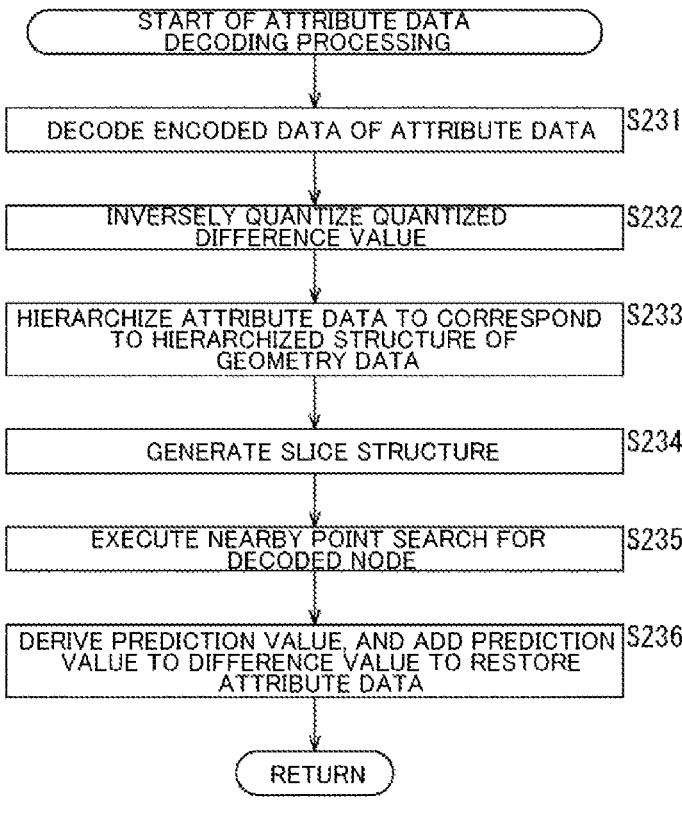

START OF ATTRIBUTE DATA
DECODING PROCESSING

DECODE ENCODED DATA OF ATTRIBUTE DATA    S231

INVERSELY QUANTIZE QUANTIZED
DIFFERENCE VALUE    S232

HIERARCHIZE ATTRIBUTE DATA TO CORRESPOND
TO HIERARCHIZED STRUCTURE OF
GEOMETRY DATA    S233

GENERATE SLICE STRUCTURE    S234

EXECUTE NEARBY POINT SEARCH FOR
DECODED NODE    S235

DERIVE PREDICTION VALUE, AND ADD PREDICTION
VALUE TO DIFFERENCE VALUE TO RESTORE
ATTRIBUTE DATA    S236

RETURN

ENCODING APPARATUS AND METHOD FOR ENCODING A DIFFERENCE VALUE BETWEEN ATTRIBUTE DATA OF A PROCESSING TARGET AND A NEARBY POINT SET AS A REFERENCE POINT

CROSS REFERENCE TO PRIOR APPLICATION

This application is a National Stage Patent Application of PCT International Patent Application No. PCT/JP2021/045929 (filed on Dec. 14, 2021) under 35 U.S.C. § 371, which claims priority to Japanese Patent Application No. 2020-218500 (filed on Dec. 28, 2020), which are all hereby incorporated by reference in their entirety.

TECHNICAL FIELD

The present disclosure relates to an information processing apparatus and method, and more particularly to an information processing apparatus and method that enable attribute data to be decoded more reliably.

BACKGROUND ART

In the related art, for example, a method of encoding 3D data representing a three-dimensional structure such as a point cloud has been considered (for example, see NPL 1). Further, a method of realizing, for example, parallelization of decoding by signaling a flag obtained by dividing an octree into node groups, for geometry data (position information) of this point cloud, or a method of decoding some node groups has been considered (see, for example, NPL 2).

Further, a method of deriving a prediction value of a processing target point using attribute data of a nearby point, for attribute data (attribute information) of a point cloud, and encoding a difference value between attribute data of the processing target point and the prediction value has been considered. As such an encoding scheme, for example, a method called lifting has been considered (see, for example, NPL 3). In the case of such an encoding scheme, a nearby point search is performed to set the point that refers to the attribute data in order to derive the prediction value.

CITATION LIST

Non Patent Literature

[NPL 1]
R. Mekuria, Student Member IEEE, K. Blom, P. Cesar., Member, IEEE, "Design, Implementation and Evaluation of a Point Cloud Codec for Tele-Immersive Video", tcsvt_paper_submitted_february.pdf
[NPL 2]
David Flynn, Khaled Mammou, "G-PCC: A hierarchical geometry slice structure", ISO/IEC JCTC1/SC29/WG11 MPEG/m54677, April 2020, Online
[NPL 3]
Khaled Mammou, Alexis Tourapis, Jungsun Kim, Fabrice Robinet, Valery Valentin, Yeping Su, "Lifting Scheme for Lossy Attribute Encoding in TMC1", ISO/IEC JTC1/SC29/WG11 MPEG2018/m42640, April 2018, San Diego, US

SUMMARY

Technical Problem

However, in the method described in NPL 3, points that are search targets are not restricted. Therefore, for example, when a node group is formed in a tree structure of attribute data, there is concern that nodes belonging to a node group that is not decoded may also become search targets. Accordingly, there is concern that decoding of the attribute data may fail.

The present disclosure has been made in view of such circumstances, and is intended to enable attribute data to be decoded more reliably.

Solution to Problem

An information processing apparatus according to an aspect of the present technology is an information processing apparatus includes a nearby point search unit configured to execute a nearby point search for setting a reference point to be referred to when deriving a prediction value of attribute data of a processing target node, only for a node that is decoded earlier than the processing target node at the time of decoding among nodes of a tree structure in which attribute data of each point of a point cloud expressing an object having a three-dimensional shape as a set of points is a node and slices serving as node groups that can be encoded independently of each other are formed; and an encoding unit configured to encode a difference value between the attribute data of the processing target node and the prediction value derived by using the attribute data of the reference point set through the nearby point search by the nearby point search unit.

An information processing method according to an aspect of the present technology is an information processing method including: executing a nearby point search for setting a reference point to be referred to when deriving a prediction value of attribute data of a processing target node, only for a node that is decoded earlier than the processing target node at the time of decoding among nodes of a tree structure in which attribute data of each point of a point cloud expressing an object having a three-dimensional shape as a set of points is a node and slices serving as node groups that can be encoded independently of each other are formed; and encoding a difference value between the attribute data of the processing target node and the prediction value derived by using the attribute data of the reference point set through the nearby point search.

An information processing apparatus according to another aspect of the present technology is an information processing apparatus including: a decoding unit configured to decode encoded data in which a difference value between attribute data and a prediction value of the attribute data has been encoded, of a processing target node of a tree structure in which attribute data of each point of a point cloud expressing an object having a three-dimensional shape as a set of points is a node and slices serving as node groups that can be encoded independently of each other are formed, to derive the difference value of the processing target node; a nearby point search unit configured to execute a nearby point search for setting a reference point to be referred to when deriving the prediction value of the processing target node only for a node decoded earlier than the processing target node by the decoding unit among the nodes of the tree structure; a restoration unit configured to restore the attribute data of the processing target node by adding the difference value derived by the decoding unit to the prediction value derived by using the attribute data of the reference point set through the nearby point search by the nearby point search unit; and an association unit configured to associate the attribute data of the point in a decoding target area restored by the restoration unit with the geometry data of the point.

An information processing method according to another aspect of the present technology is an information processing method including: decoding encoded data in which a difference value between attribute data and a prediction value of the attribute data has been encoded, of a processing target node of a tree structure in which attribute data of each point of a point cloud expressing an object having a three-dimensional shape as a set of points is a node and slices serving as node groups that can be encoded independently of each other are formed, to derive the difference value of the processing target node; executing a nearby point search for setting a reference point to be referred to when deriving the prediction value of the processing target node only for a node decoded earlier than the processing target node among the nodes of the tree structure; restoring the attribute data of the processing target node by adding the derived difference value to the prediction value derived by using the attribute data of the reference point set through the nearby point search; and associating the restored attribute data of the point in a decoding target area with the geometry data of the point.

In the information processing apparatus and method according to an aspect of the present technology, a nearby point search for setting a reference point to be referred to when deriving a prediction value of attribute data of a processing target node is executed only for a node that is decoded earlier than the processing target node at the time of decoding among nodes of a tree structure in which attribute data of each point of a point cloud expressing an object having a three-dimensional shape as a set of points is a node and slices serving as node groups that can be encoded independently of each other are formed, and a difference value between the attribute data of the processing target node and the prediction value derived by using the attribute data of the reference point set through the nearby point search by the nearby point search unit is encoded.

In the information processing apparatus and method according to another aspect of the present technology, encoded data in which a difference value between attribute data and a prediction value of the attribute data has been encoded, of a processing target node of a tree structure in which attribute data of each point of a point cloud expressing an object having a three-dimensional shape as a set of points is a node and slices serving as node groups that can be encoded independently of each other are formed is decoded to derive the difference value of the processing target node, a nearby point search for setting a reference point to be referred to when deriving the prediction value of the processing target node is executed only for the node decoded earlier than the processing target node among the nodes of the tree structure, the attribute data of the processing target node is restored by adding the derived difference value to the prediction value derived by using the attribute data of the reference point set through the nearby point search, and the restored attribute data of the point in a decoding target area is associated with the geometry data of the point.

BRIEF DESCRIPTION OF DRAWINGS

FIG. 5 is a diagram illustrating an example of a nearby point search method.

FIG. 11 is a diagram illustrating an example of an association method.

FIG. 21 is a flowchart describing an example of a flow of attribute data decoding processing.

DESCRIPTION OF EMBODIMENTS

Figure 1:
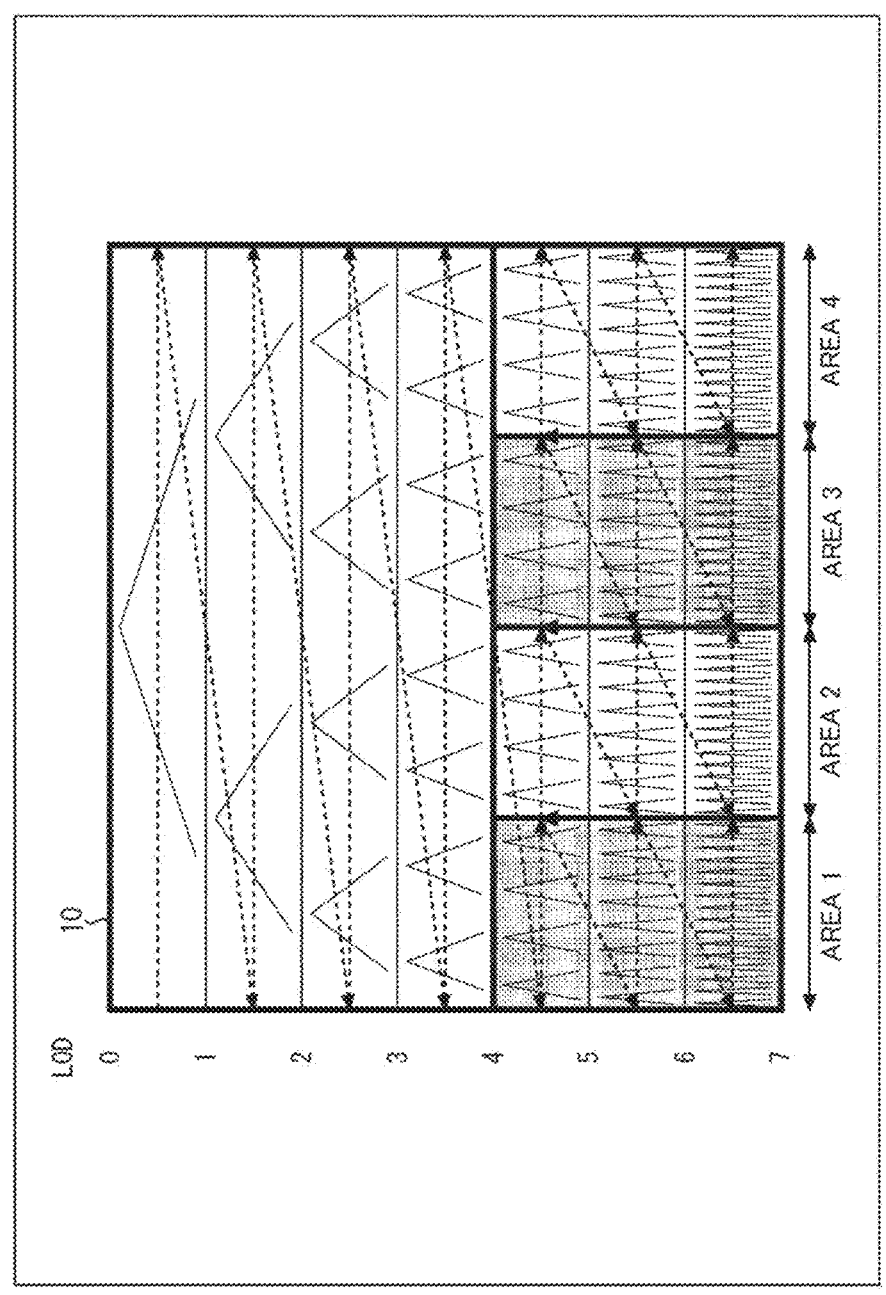
FIG. 1 is a diagram illustrating examples of a tree structure and a slice structure.

Hereinafter, a form for carrying out the present disclosure (hereinafter referred to as an embodiment) will be described. The description will be given in the following order.
1. Restriction on Nearby Point Search
2. Restriction on Association
3. First Embodiment (Encoding Apparatus)
4. Second Embodiment (Decoding Apparatus)
5. Supplements

1. Restriction on Nearby Point Search

Literature Supporting Technical Content and Technical Terms, or Like

The scope disclosed in the present technology includes not only the content described in the embodiments, but also the content described in the following non patent literature known at the time of filing.
NPL 1: (described above)
NPL 2: (described above)
NPL 3: (described above)
That is, content described in the above-described non patent literature, content of other literature referred to in the above-described non patent literature, and the like are also the basis for determining the support requirements.

<Point Cloud>

In the related art, as 3D data, there has been a point cloud that represents a three-dimensional structure (an object having a three-dimensional shape) as a set of many points. Data of a point cloud (also referred to as point cloud data) includes position information (also referred to as a geometry) and attribute information (also referred to as an attribute) of each point. The attributes may include arbitrary information. For example, the attributes may include color information, reflectance information, normal information, and the like for each point. Thus, the point cloud has a relatively simple data structure and can represent any three-dimensional structure with sufficient accuracy by using a sufficiently large number of points.

The point cloud data has a relatively large amount of data. Further, the amount of data increases in proportion to an increase in the number of points. This increases a load when the point cloud data is transmitted or stored, for example. Therefore, in order to reduce the amount of data, voxel conversion is considered. A voxel is a three-dimensional area for quantizing a geometry (position information).

That is, the three-dimensional area (also called a bounding box) including the point cloud is divided into small three-dimensional areas called voxels, and whether or not each voxel contains a point is indicated. By doing this, the position of each point is quantized in units of voxels. Therefore, an increase in amount of information can be suppressed (typically, the amount of information can be reduced).

The resolution of the geometry (that is, the number of points) depends on a size of the voxel (in other words, the number of voxels). When the voxel size is smaller (there are more voxels), the number of points increases, and thus the resolution of the geometry becomes higher.

It is conceivable to divide the voxel recursively using such characteristics and convert the geometry into a tree structure. Such a method enables the resolution of the geometry to be variable. That is, the geometry can be represented not only at the highest resolution corresponding to a bottom layer of the tree structure, but also at a low resolution corresponding to an intermediate layer of the tree structure.

Further, a method of encoding or decoding point cloud data has been considered in order to suppress an increase in load when point cloud data is transmitted or stored. For example, when the point cloud data is transmitted, a transmission side encodes the point cloud data to generate a bitstream and transmits the bitstream, and a reception side decodes the bitstream to generate the point cloud data. By doing this, it is possible to reduce a data amount at the time of transmission, and to suppress an increase in load. The same applies to a case in which point cloud data is stored.

As described above, the point cloud includes the geometry and the attribute. That is, each piece of data of the geometry and the attribute is encoded or decoded.

It is possible to decode encoded data of the geometry in a scalable manner with respect to the resolution by encoding data of the geometry (also referred to as geometry data) according to the tree structure described above. That is, it is possible to realize resolution scalability in the decoding processing. For example, it becomes possible to realize partial decoding such as decoding only nodes from a top layer to an arbitrary layer of the tree structure (not decoding the nodes in lower layers). That is, it is possible to obtain the geometry having desired resolution by decoding only a necessary part without decoding all encoded data of the geometry.

<Node Grouping>

Incidentally, NPL 2 discloses a method of signaling a flag for dividing a tree structure (Octree) of this point cloud into node groups. This method enables independent decoding for each node group. Therefore, for example, the decoding processing can be divided for each node group and parallelized. It is also possible to decode only some node groups. For example, it is possible to decode only a geometry of a partial area by dividing the node group into partial areas of a three-dimensional area. That is, in the decoding processing, it is possible to realize scalability for the area. That is, it is possible to obtain a geometry of a desired area by decoding only a necessary part without decoding all encoded data of the geometry.

This node group is also called a slice. That is, the slice is a group of nodes in a tree structure of geometry. The geometry data can be encoded independently for each slice. In other words, the encoded data of the geometry data can be independently decoded for each slice. A tree structure of the geometry may be any tree structure. For example, tree structure may be an Octree or a KD Tree, or may be another structure.

Another example of the slice structure set in the geometry data is illustrated in FIG. 1. In FIG. 1, a thin solid line indicates the tree structure, and branching points of the solid line indicate the nodes. A node group surrounded by a thick line forms one slice. LoD indicates a hierarchy of the tree structure.

That is, all nodes of LoD0 to LoD4 belong to slice 1. Nodes in area 1 (gray background area) of LoD5 to LoD7 belong to slice 2. Nodes in area 2 (white background area) of LoD5 to LoD7 belong to slice 3. Nodes in area 3 (gray background area) of LoD6 to LoD7 belong to slice 4. Nodes in area 4 (white background area) of LoD5 to LoD7 belong to slice 5.

Dotted arrows indicate an order of encoding and decoding. For example, the respective nodes of LoD0 to LoD4 are encoded for each layer in order from a higher layer to a lower layer for the entire area. The respective nodes of LoD5 to LoD7 are encoded for each layer in order from the higher layer to the lower layer for each of area 1 to area 4. A decoding order is also the same.

When such a slice structure is formed, it is possible to decode only some of the slices. For example, when geometry data for points in area 3 at resolution of LoD7 is required, the nodes in slices 1 and 4 may be decoded. In other words, in this case, decoding of nodes of slice 2, slice 3, and slice 5 are not necessary. By doing so, it is possible to reduce an amount of decoding processing as compared to a case in which all the nodes of LoD7 are decoded.

<Lifting>

On the other hand, a method of performing encoding or decoding an attribute using a positional relationship between points on the assumption that geometry, including deterioration due to encoding, is known has been considered. A method using region adaptive hierarchical transform (RAHT) or a transform called Lifting as described in NPL 2 has been considered as such a method of encoding the attribute. It is also possible to hierarchize attributes, like Octree of geometry by applying these technologies.

For example, in the case of lifting, the attribute data of each point is encoded as a difference value from the prediction value derived by referring to attribute data of other points. For example, this will be described as a two-dimension. Each circle in A of FIG. 2 indicates a point. It is assumed that the point group has such a positional relationship. The attribute data of each point is encoded or decoded as a difference value from the prediction value derived by referring to the attribute data of the other points, as indicated by arrows illustrated in B of FIG. 2.

It is possible to realize scalable decoding of attribute data by hierarchizing (structuring into a tree structure) the attribute data of each point, as in the case of the geometry data. Furthermore, it is possible to realize scalable decoding of the point cloud data by associating this tree structure of attributes with the tree structure of the geometry. In this case, the attribute data of each point may be hierarchized using the geometry.

Figure 2:
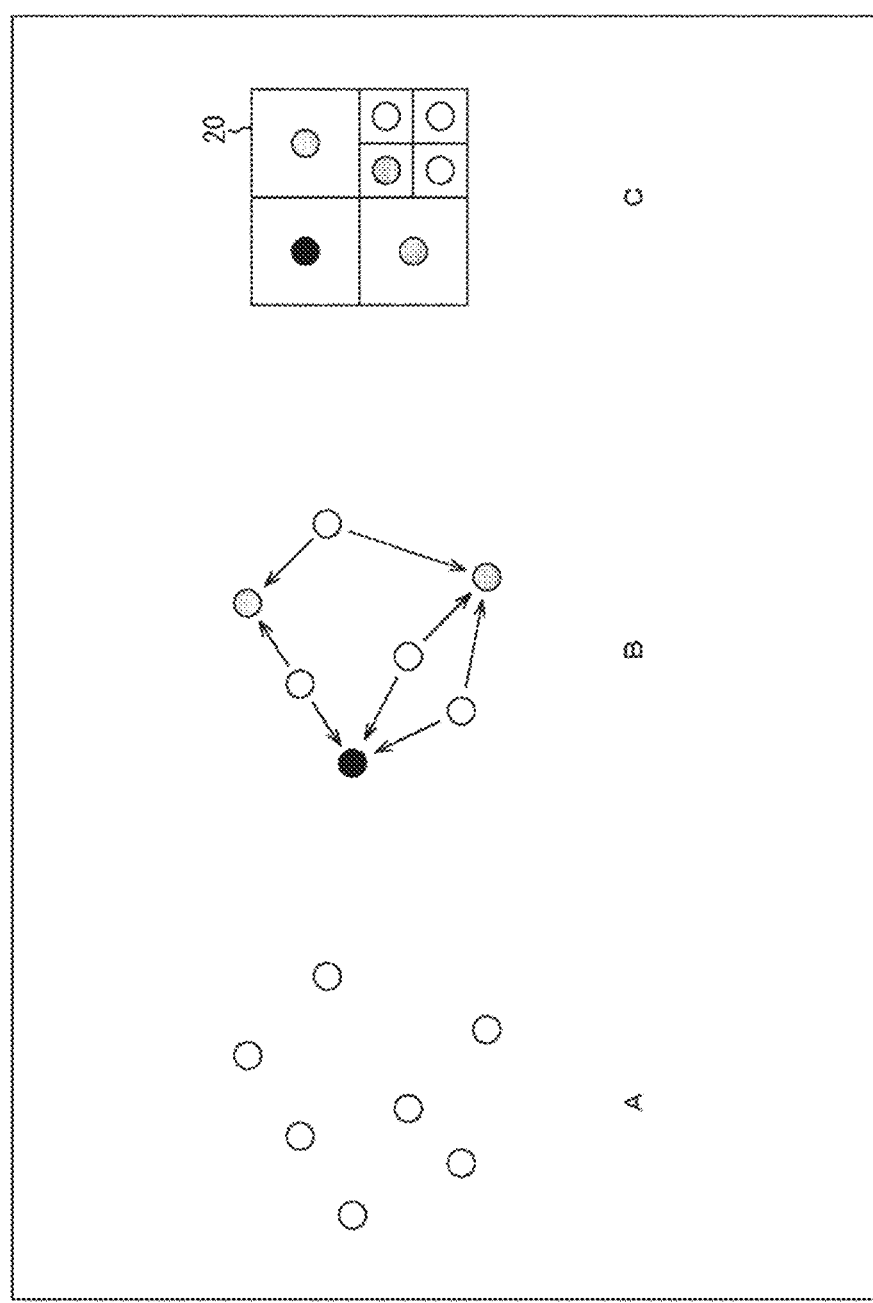
FIG. 2 is a diagram illustrating an example of a method of hierarchizing attribute data.

For example, as illustrated in C of FIG. 2, a prediction point is selected so that attribute information remains in a voxel of one higher layer (LoD) to a voxel in which there is a point belongs. In C of FIG. 2, a square indicates a voxel and a circle indicates a point. A voxel 20 is divided into four pieces to form one lower layer voxel, and the lower right voxel is divided into four pieces to form one lower layer voxel. The point (gray point) of any one voxel among the four points (3 white points and one gray point) of the voxel of the lowest layer is left in one higher layer voxel. That is, one black point and three gray points are left in the voxels obtained by dividing the voxel 20 into four pieces. Similarly, one (black point) among these is left in one higher layer voxel (that is, the voxel 20). By hierarchizing the attribute data in this manner, it is possible to form, for the attribute data, the same hierarchical structure (tree structure) as that of the geometry data.

<Nearby Point Search>

In order to derive the prediction value of the attribute of the processing target point by referring to the attribute data of the other points (nearby points) as illustrated in B of FIG. 2, search for nearby points that refer to the attribute data (also referred to as nearby point search) is executed. Examples of reference methods for deriving this prediction value include inter reference (also called inter-LoD reference) that refers to a point belonging to a LoD different from the LoD to which the processing target point belongs, and an intra reference (also called an intra-LoD reference) that refers to a point belonging to the same LoD as the processing target point.

<Attribute Node Grouping>

Figure 3:
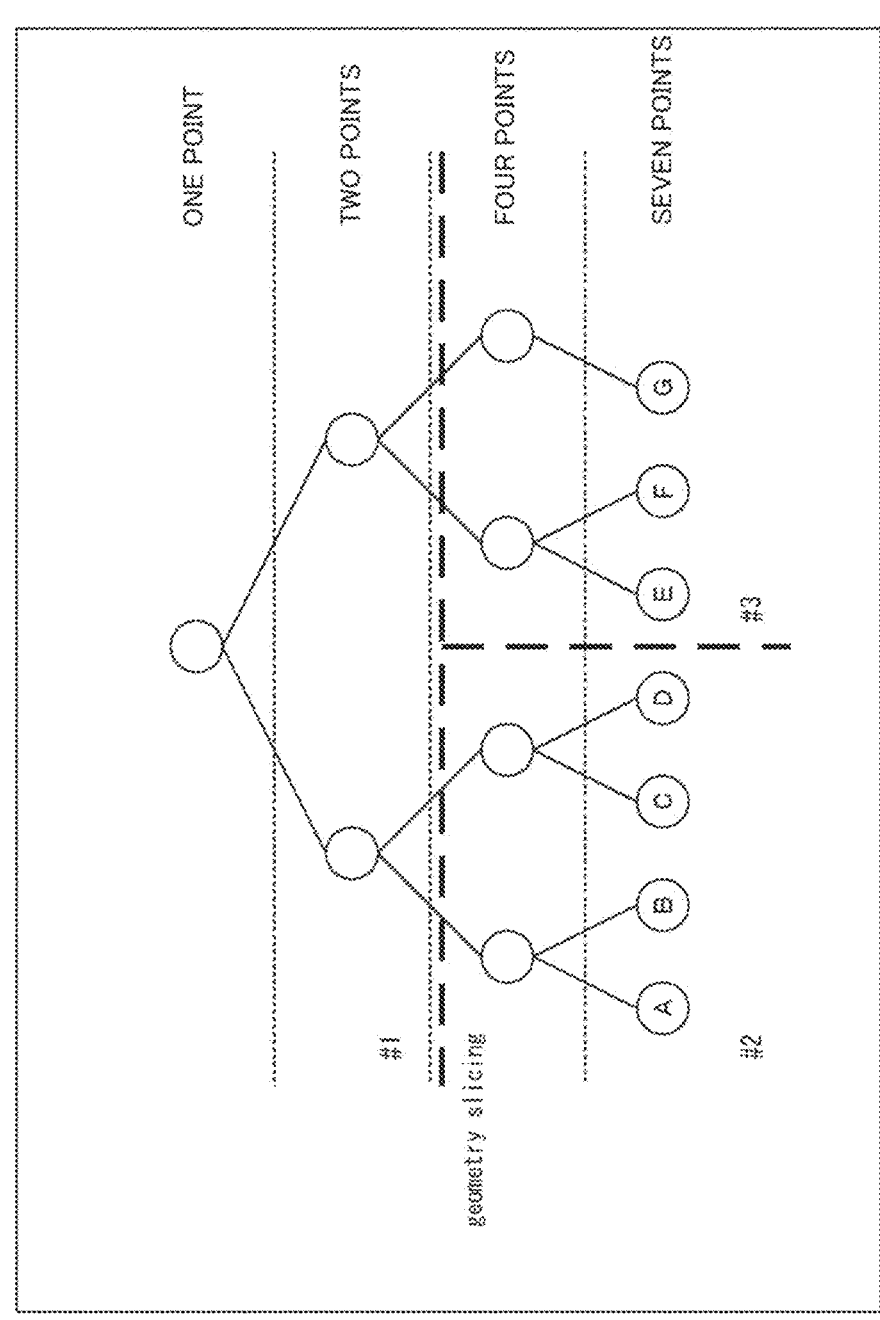
FIG. 3 is a diagram illustrating an example of a slice structure of geometry data.

Incidentally, geometry data can be node grouped (sliced) in a tree structure, as described above. FIG. 3 illustrates an example of the slice structure. In the example of FIG. 3, an entire area of the upper 2 LoDs is sliced into one (slice #1). On the other hand, the lower 2 LoDs are divided into two areas, and each area is sliced (slice #2 and slice #3). For example, nodes A to D in the lowest layer belong to slice #2, and nodes E to G belong to slice #3.

Figure 4:
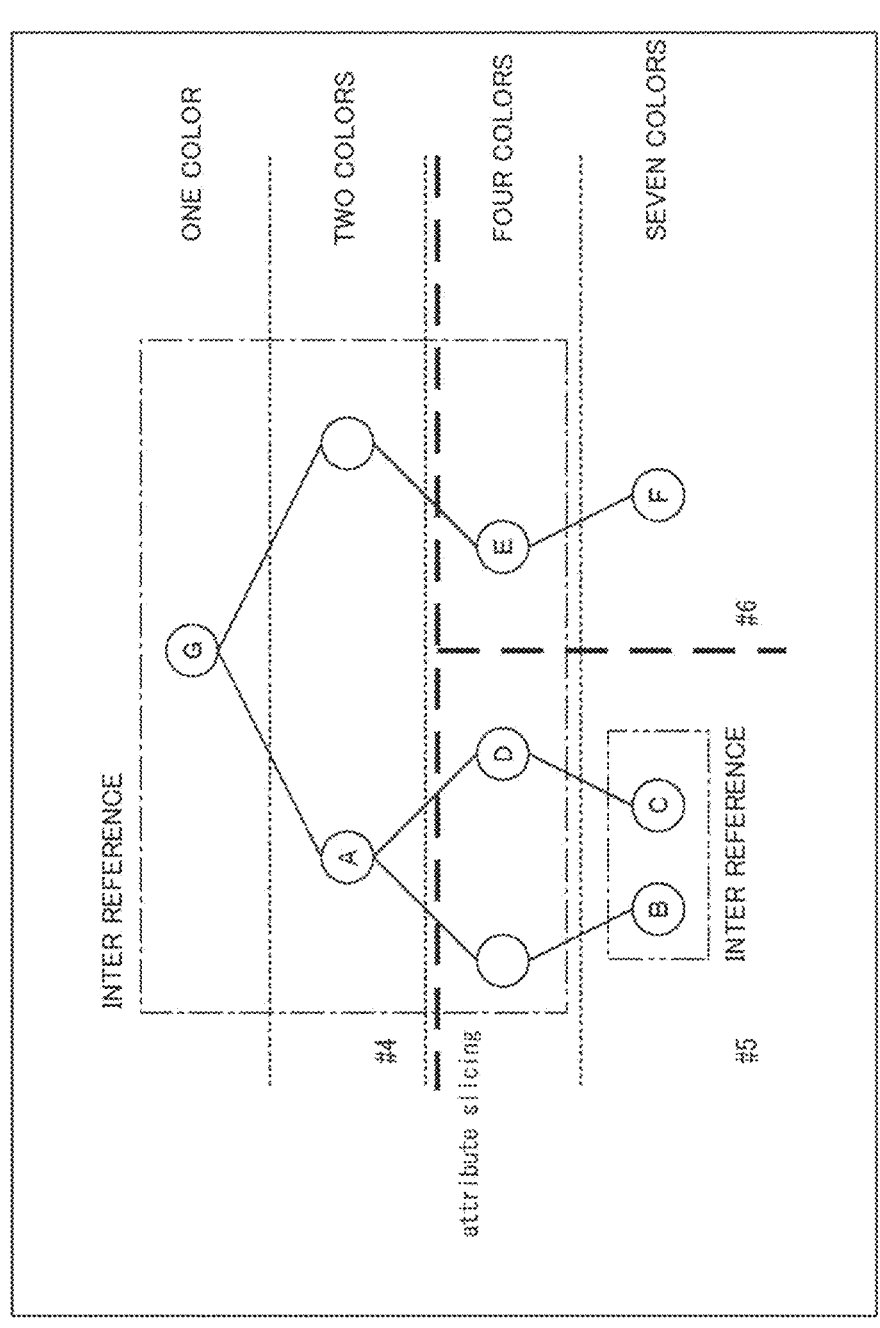
FIG. 4 is a diagram illustrating an example of a reference target of attribute data.

Node grouping (slicing) may also be considered for the attribute data, similar to such slicing. Accordingly, it is expected that the attribute data can be encoded or decoded in parallel, and only some of the slices can be decoded. In FIG. 4, an example of the slice structure of the attribute data in this case is illustrated. Nodes A to G in FIG. 4 correspond to FIG. 3. In the example of FIG. 4, an entire area of the upper 2 LoDs are all sliced into one (slice #4), as in the case of the geometry data of FIG. 3. On the other hand, the lower 2 LoDs are divided into two areas, and each area is sliced (slice #5 and slice #6).

However, the attribute encoding method and decoding method described in NPL 2 do not support such a slice structure.

For example, since the attribute data of each node is decoded for each LoD, and the target of the nearby point search is not restricted, attribute data of points in all areas become the target of the nearby point search. Therefore, there is concern that attribute data of points in an area that is not a decoding target (that is, nodes belonging to a slice not to be decoded) is referred to.

For example, when node F is the decoding target in the example of FIG. 4, the target of the nearby point search at the time of inter reference is a node within a frame indicated by a dashed-dotted line in the method described in NPL 2. That is, node A, node D, node E, and node G among nodes A to G are search targets. Further, the target of the nearby point search at the time of intra reference is a node within a frame indicated by a double-dotted line. That is, nodes B and C among nodes A to G are search targets.

When the slicing is performed as illustrated in FIG. 4, at least slice #4 and slice #6 may be decoded to decode node F. In other words, slice #5 may not be decoded. However, in the case of the method described in NPL 2, there is concern that the node of slice #5 is also referenced as described above. In this case, independent decoding for each slice becomes impossible, and there is concern that the attribute data cannot be decoded.

Therefore, in a tree structure (also called an attribute tree) of attribute data to which slicing is applied, nearby point search is executed only for decoded nodes, as illustrated in the top row of the table in FIG. 5 (Method 1). This decoded node is a node that is decoded earlier than the processing target node at the time of decoding. Further, "execute nearby point search only for a decoded node" indicates that the "decoded node" is set as a target of the nearby point search, and other nodes (nodes that have not been decoded) are not set as targets of nearby point search among the nodes in the tree structure.

For example, an information processing method includes executing a nearby point search for setting a reference point to be referred to when deriving a prediction value of attribute data of a processing target node, only for a node that is decoded earlier than the processing target node at the time of decoding among nodes of a tree structure in which attribute data of each point of a point cloud expressing an object having a three-dimensional shape as a set of points is a node and slices serving as node groups that can be encoded independently of each other are formed; and encoding a difference value between the attribute data of the processing target node and the prediction value derived by using the attribute data of the reference point set through the nearby point search.

For example, an information processing apparatus includes a nearby point search unit configured to execute a nearby point search for setting a reference point to be referred to when deriving a prediction value of attribute data of a processing target node, only for a node that is decoded earlier than the processing target node at the time of decoding among nodes of a tree structure in which attribute data of each point of a point cloud expressing an object having a three-dimensional shape as a set of points is a node and slices serving as node groups that can be encoded independently of each other are formed; and an encoding unit configured to encode a difference value between the attribute data of the processing target node and the prediction value derived by using the attribute data of the reference point set through the nearby point search by the nearby point search unit.

For example, an information processing method includes decoding encoded data in which a difference value between attribute data and a prediction value of the attribute data has been encoded, of a processing target node of a tree structure in which attribute data of each point of a point cloud expressing an object having a three-dimensional shape as a set of points is a node and slices serving as node groups that can be encoded independently of each other are formed, to derive the difference value of the processing target node; executing a nearby point search for setting a reference point to be referred to when deriving the prediction value of the processing target node only for a node decoded earlier than the processing target node among the nodes of the tree structure; and restoring the attribute data of the processing target node by adding the derived difference value to the prediction value derived by using the attribute data of the reference point set through the nearby point search.

For example, an information processing apparatus includes a decoding unit configured to decode encoded data in which a difference value between attribute data and a prediction value of the attribute data has been encoded, of a processing target node of a tree structure in which attribute data of each point of a point cloud expressing an object having a three-dimensional shape as a set of points is a node and slices serving as node groups that can be encoded independently of each other are formed, to derive the difference value of the processing target node; a nearby point search unit configured to execute a nearby point search for setting a reference point to be referred to when deriving the prediction value of the processing target node only for a node decoded earlier than the processing target node by the decoding unit among the nodes of the tree structure; and a restoration unit configured to restore the attribute data of the processing target node by adding the difference value derived by the decoding unit to the prediction value derived by using the attribute data of the reference point set through the nearby point search by the nearby point search unit.

"Only for the nodes that are decoded (or that have been decoded) earlier than the processing target node," and "nearby point search is executed" indicate the nearby point search is performed on "among the nodes of the tree structure," and "the nodes that are decoded (or that have been decoded) earlier than the processing target node", with other nodes excluded from the targets. By limiting the target of the nearby point search as described above, it is possible to independently decode the attribute data for each slice, and to decode the attribute data more reliably.

The tree structure of the attribute data may have, as a node, the attribute data of each point hierarchized on the basis of the geometry data.

For example, the tree structure of the attribute data may have, as a node, the attribute data of each point hierarchized so that there is also a point at a voxel of one higher layer to which a voxel in which there is a point of a processing target layer belongs, on the basis of the geometry data.

Further, the geometry data may form a hierarchized tree structure on the basis of geometry resolution, and each node of the tree structure of the attribute data may correspond to each node of the tree structure of the geometry data. Further, slices serving as node groups that can be encoded independently of each other are formed in the tree structure of the geometry data, and a structure of the slices formed in the tree structure of the attribute data may correspond to a structure of the slices formed in the tree structure of the geometry data.

It is possible to realize scalable decoding of the point cloud data by associating the tree structure of the attribute data with the tree structure of the geometry data in this way. Further, it is possible to independently restore the point cloud data for each slice by associating the slice structure of the attribute data with the slice structure of the geometry data.

<Inter Reference>

As illustrated in the second row from the top of the table in FIG. 5, nearby point search for inter-LoD reference (inter reference) may be executed on decoded nodes (Method 1-1). For example, in the information processing apparatus, the nearby point search unit may execute the nearby point search only for nodes that are decoded earlier than the processing target node at the time of decoding, on the higher layer than the processing target node among the nodes of the tree structure of the attribute data. Alternatively, in the information processing apparatus, the nearby point search unit may execute the nearby point search only for nodes decoded earlier than the processing target node by the decoding unit, on the higher layer than the processing target node among nodes of the tree structure of the attribute data.

By doing so, it is possible to independently decode the attribute data to which inter reference is applied at the time of decoding for each slice, and to decode the attribute data more reliably.

<Nearby Point Search Target Restriction for Inter Reference Based on Slice Structure>

As the nearby point search for inter reference, as illustrated in a third row from the top of the table in FIG. 5, the nearby point search may be executed for nodes belonging to the decoded slice (Method 1-1-1). The decoded slice is (a node of) a slice that is decoded earlier than the processing target node at the time of decoding.

For example, in the information processing apparatus, the nearby point search unit may execute the nearby point search only for nodes belonging to the same slice as the processing target node and on the higher layer than the processing target node decoded earlier than the processing target node at the time of decoding among the nodes of the tree structure of the attribute data, and nodes belonging to the slice decoded earlier than the slice to which the processing target node belongs at the time of decoding. Further, in the information processing apparatus, the nearby point search unit may execute the nearby point search only for nodes belonging to the same slice as the processing target node and on a higher layer than the processing target node decoded earlier than the processing target node by the decoding unit among the nodes of the tree structure of the attribute data, and nodes belonging to slices decoded earlier than the slice to which the processing target node belongs by the decoding unit.

Figure 6:
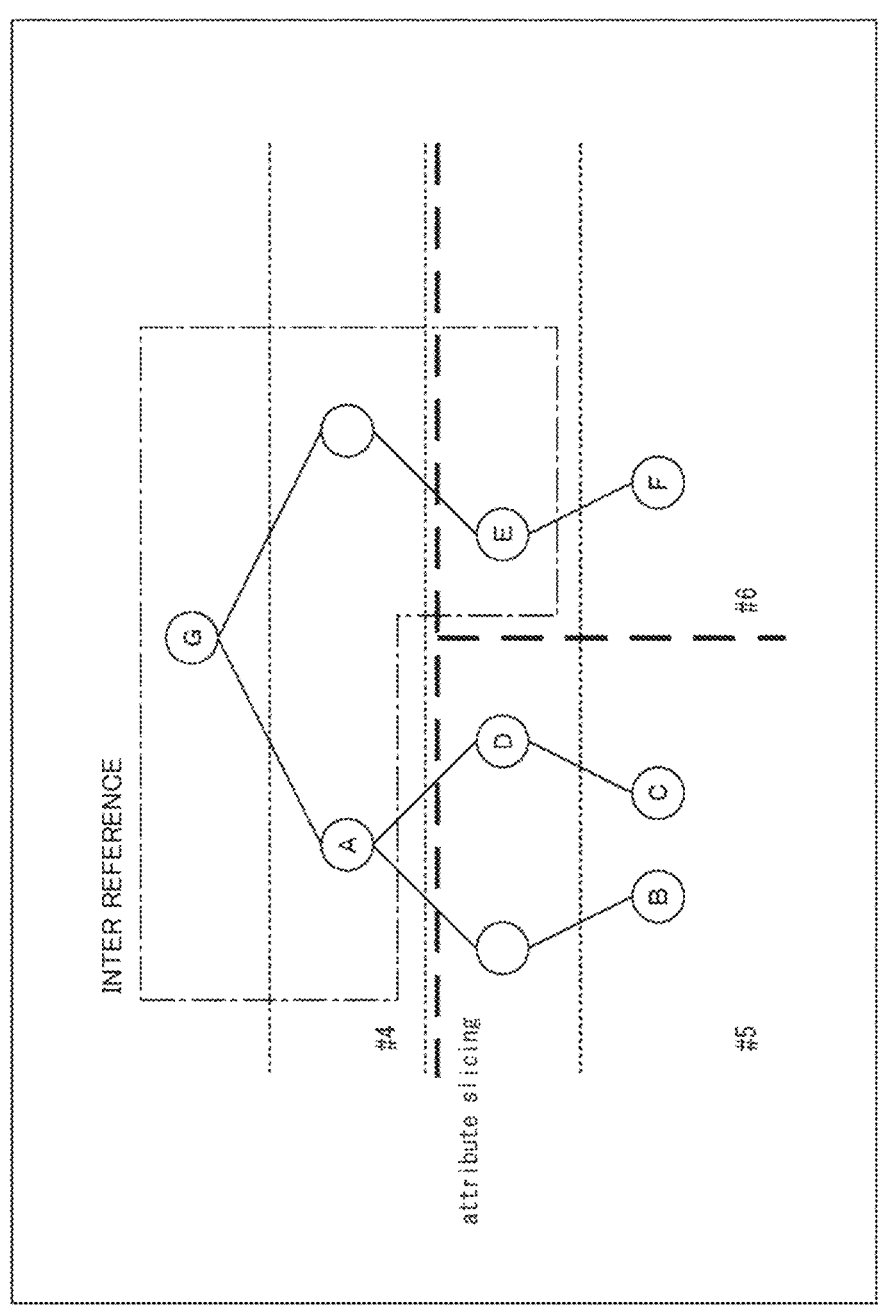
FIG. 6 is a diagram illustrating an example of a search target for inter-LoD reference.

In this case, for example, when node F in the tree structure of FIG. 4 is set to a decoding target, the nearby point search for inter reference is executed for nodes within a frame of a dashed-dotted line illustrated in FIG. 6. That is, node A, node E, and node G among nodes A to G are search targets. In other words, nodes B to D, that is, nodes belonging to slice #5 are excluded from the nearby point search (not set as nodes that refer to attribute data).

Therefore, in this case, it is possible to independently decode the attribute data for each slice, and to decode the attribute data more reliably.

<Nearby Point Search Target Restriction for Inter Reference Based on Tree Structure>

Further, as the nearby point search for inter reference, the nearby point search may be executed for the ancestor nodes of the tree structure of the attribute data, as illustrated in a fourth row from the top of the table in FIG. 5 (Method 1-1-2). Here, the ancestor node is an upper LoD node to which the processing target node directly or indirectly belongs in the tree structure of the attribute data. For example, in the case of tree structure illustrated in FIG. 7, a straight line between nodes indicates a parent-child relationship between the nodes. A node that is directly or indirectly connected to the processing target node by a straight line in a direction from a certain node (reference node) to the upper LoD is referred to as an ancestor node of the reference node.

The directly connected node indicates a node that is connected to a certain node by a straight line without passing through another node. For example, node E is a node directly connected to node F. The indirectly connected node is a node that is connected to a certain node via another node by a straight line. For example, node G is a node indirectly connected to node F (connected via node E, or the like). That is, this node E and node G are ancestor nodes of node F.

It can be said that nodes A to D, or the like are also indirectly connected to node F (connected through node G, or the like), but these nodes belong to a lower LoD than node G. That is, the nodes are not ancestor nodes of node F because the nodes are not nodes (indirectly) connected in a direction toward the upper LoD when viewed from node F.

For example, in the information processing apparatus, the nearby point search unit may execute the nearby point search only for the ancestor nodes of the processing target node among the nodes of the tree structure of the attribute data.

Figure 7:
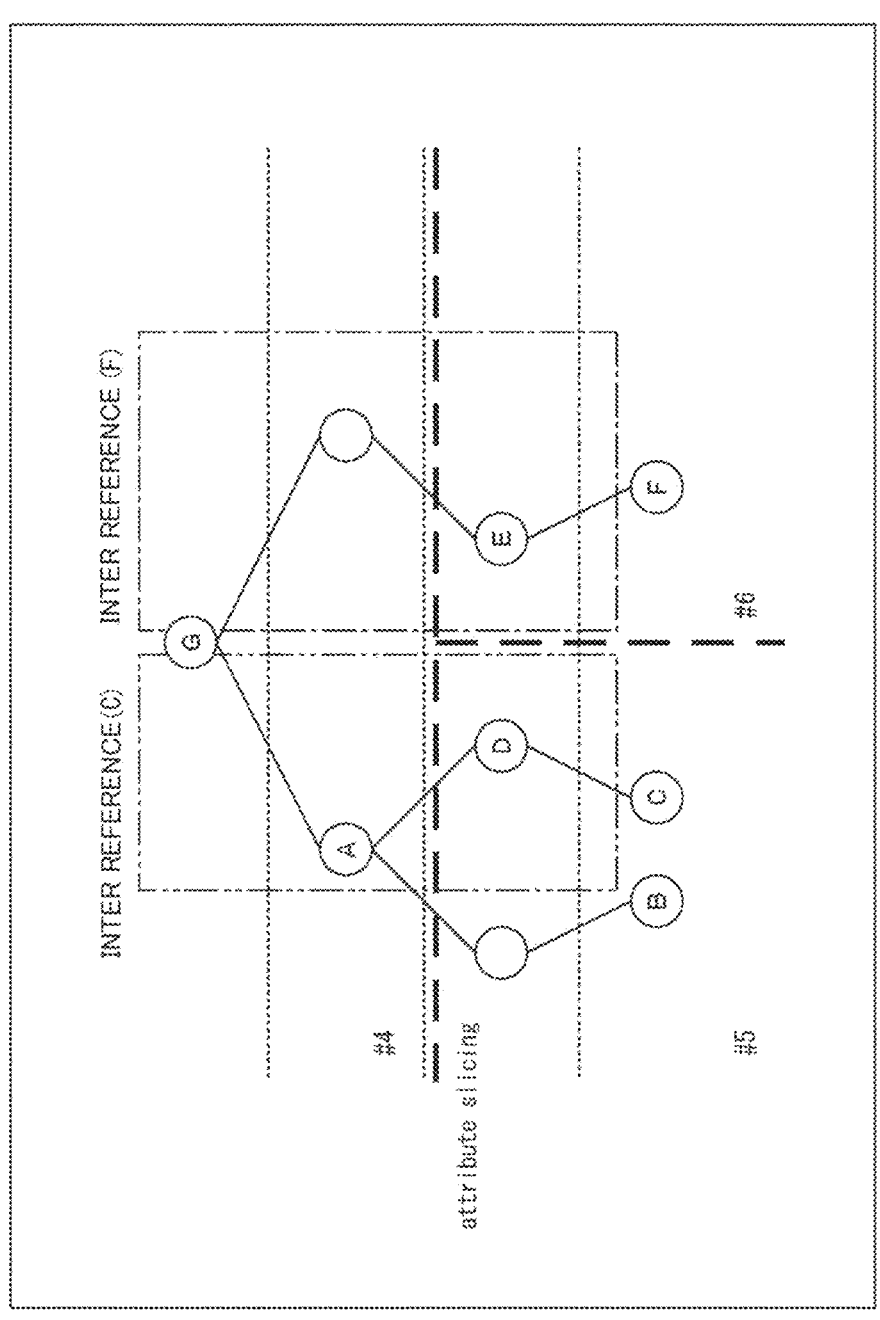
FIG. 7 is a diagram illustrating an example of a search target for inter-LoD reference.

That is, in this case, for example, when node F in the tree structure of FIG. 4 is set to a decoding target, nearby point search for inter reference is executed for nodes within a frame of a dashed line illustrated in FIG. 7. That is, node E and node G among nodes A to G are search targets. In other words, nodes A to D are excluded from the nearby point search targets (not set as nodes that refer to attribute data). That is, in this case, the nodes belonging to slice #5 are excluded from the nearby point search targets. For example, when node C belonging to slice #5 is set to the decoding target, the nearby point search for inter reference is executed for nodes within a frame indicated by a double-dotted line illustrated in FIG. 7. That is, node A, node D, and node G among nodes A to G becomes search targets. In other words, node B, node E, and node F are excluded from the nearby point search (not set as nodes that refer to attribute data). That is, in this case, nodes belonging to slice #6 are excluded from nearby point search targets.

Therefore, in this case, it is possible to independently decode the attribute data for each slice, and to decode the attribute data more reliably.

<Intra Reference>

As illustrated in a fifth row from the top of the table in FIG. 5, the nearby point search for intra LoD reference (intra reference) may be executed for decoded nodes (Method 1-2). For example, in the information processing apparatus, the nearby point search unit may execute the nearby point search only for nodes that are decoded earlier than the processing target node at the time of decoding among the nodes on the same layer as the processing target node in the tree structure of the attribute data, as described above in <Intra Reference>. Alternatively, in the information processing apparatus, the nearby point search unit may execute the nearby point search only for the nodes decoded earlier than the processing target node by the decoding unit on the same layer as the processing target node among the nodes of the tree structure of the attribute data.

By doing so, it is possible to independently decode the attribute data to which the intra reference is applied at the time of decoding decoded for each slice, and to decode attribute data more reliably.

<Nearby Point Search Target Restriction for Intra Reference Based on Slice Structure>

As the nearby point search for the intra reference, nearby point search may be performed on the decoded nodes in the processing target LoD of the processing target slice, as shown at the bottom of the table in FIG. 5 (Method 1-2-1). The processing target slice is a slice to which the processing target node belongs. The processing target LoD is a LoD to which the processing target node belongs. The decoded node is a node that is decoded earlier than the processing target node at the time of decoding.

For example, in the information processing apparatus, the nearby point search unit may execute the nearby point search only for nodes belonging to the same slice as the processing target node and on the same layer as the processing target node that is decoded earlier than the processing target node at the time of decoding among the nodes of the tree structure of the attribute data. Further, in the information processing apparatus, the nearby point search unit may execute the nearby point search only for nodes belonging to the same slice as the processing target node and on the same layer than the processing target node decoded earlier than the processing target node by the decoding unit among the nodes of the tree structure of the attribute data.

Figure 8:
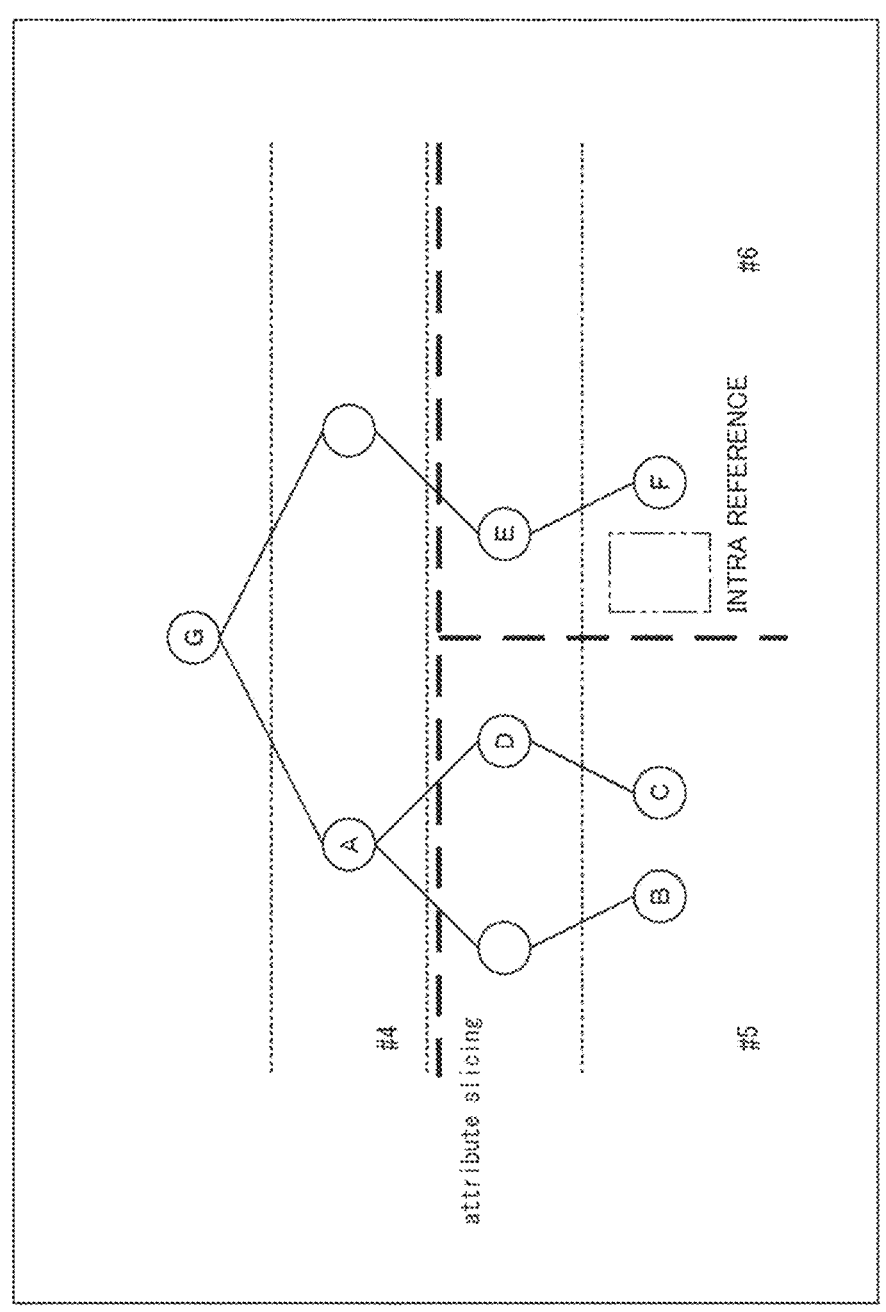
FIG. 8 is a diagram illustrating an example of a search target for intra-LoD reference.

In this case, for example, when node F in the tree structure of FIG. 4 is a decoding target, the nearby point search for intra reference is executed for a node within a frame indicated by a double-dotted line illustrated in FIG. 8. That is, in this case, a node of a lowest LoD in slice #6 is a search target. In other words, node B and node C, that is, nodes belonging to slice #5 are excluded from the nearby point search (not set as nodes that refer to attribute data).

Therefore, in this case, it is possible to independently decode the attribute data for each slice, and to decode the attribute data more reliably.

2. Restriction on Association

<Association Between Geometry and Attribute>

Incidentally, when the geometry data is decoded and the attribute data is decoded, the geometry data and the attribute data are associated with each other. That is, the geometry and attributes are grouped (associated) for each point to generate point cloud data.

However, when the attribute data is divided into slices and is decoded as described above, there is concern that the association with the geometry is not made.

Figure 9:
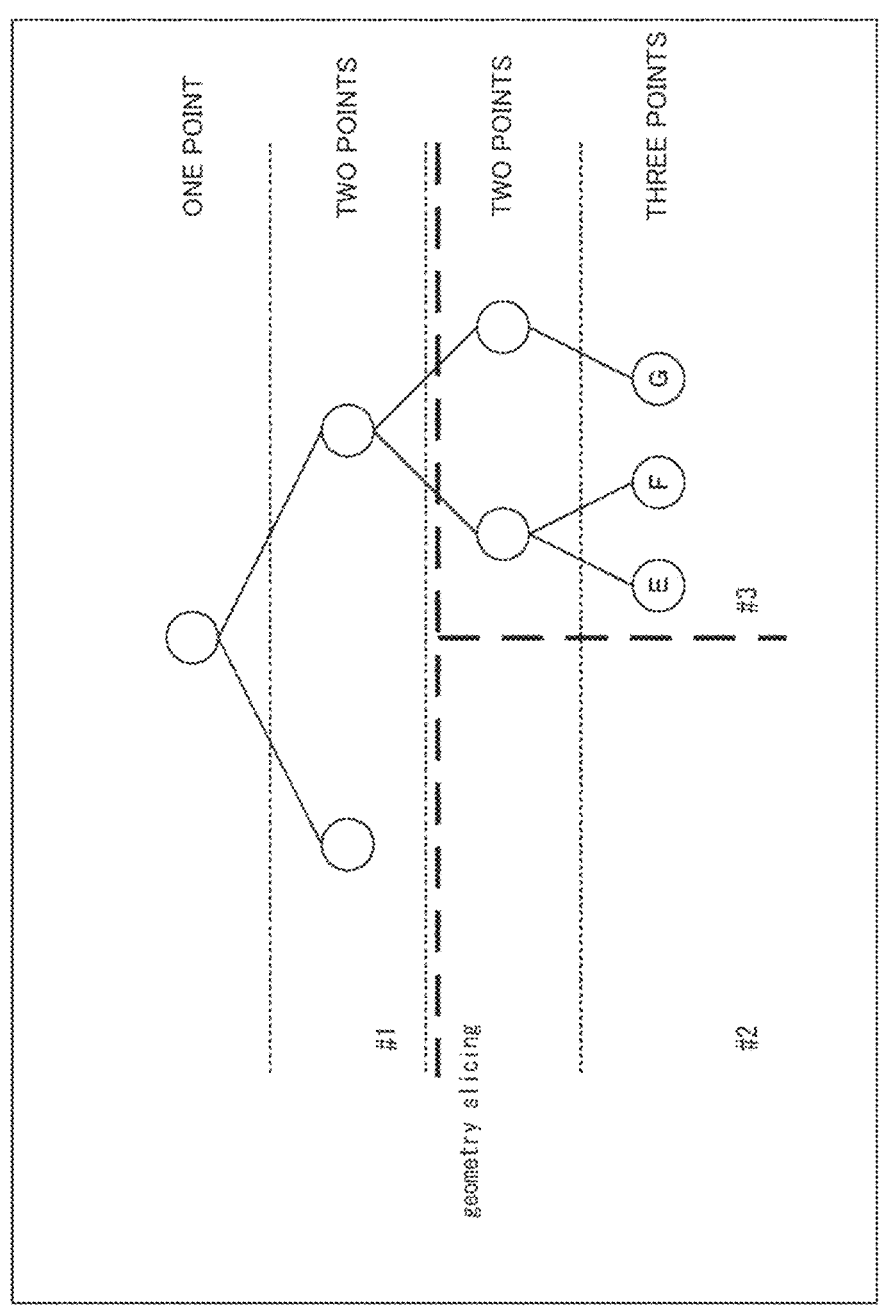
FIG. 9 is a diagram illustrating an example of a case in which a slice of a part of geometry data is decoded.

For example, it is assumed that slice #1 and slice #3 of the geometry data are decoded and slice #2 is not decoded, as illustrated in FIG. 9. In this case, the number of pieces of geometry data to be decoded is 1 point, 2 points, 2 points, and 3 points from the upper LoD to the lower LoD, as illustrated in FIG. 9.

Figure 10:
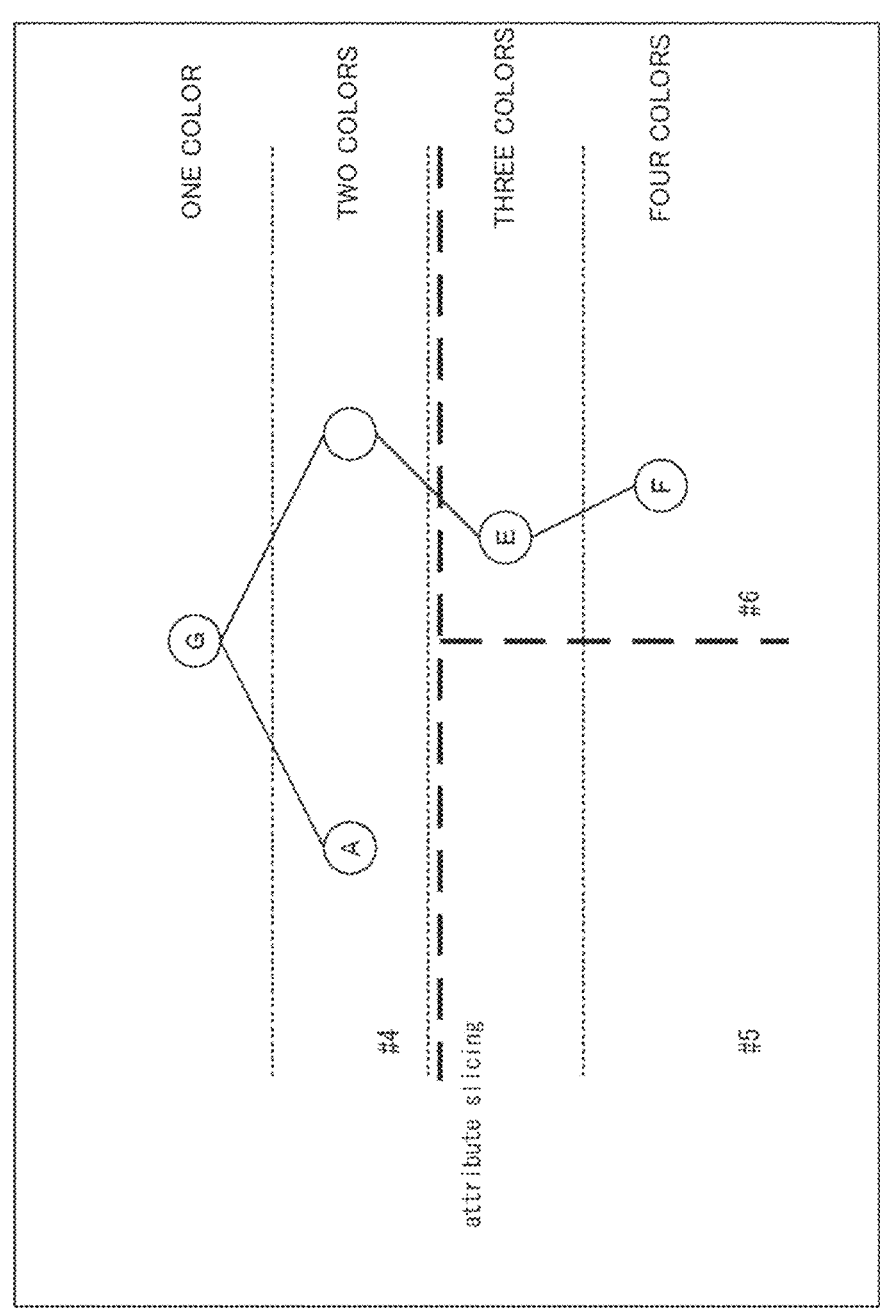
FIG. 10 is a diagram illustrating an example of a case in which a slice of a part of attribute data is decoded.

On the other hand, it is assumed that slice #4 and slice #6 of the attribute data are decoded and slice #5 is not decoded, as illustrated in FIG. 10. In this case, the number of pieces of attribute data to be decoded is one color, two colors, three colors, and four colors from the upper LoD to the lower LoD, as illustrated in FIG. 10. That is, in the lower 2 LoDs, the number of pieces of decoded geometry data and the number of pieces of decoded attribute data do not match. Therefore, for the lower 2 LoDs, there is concern that the geometry data and the attribute data cannot be associated and the point cloud data cannot be generated.

<Association Restriction Based on Slice Structure>

Therefore, as shown at the top of the table in FIG. 11, in the association between the geometry data and the attribute data (that is, generation of the point cloud data), the attributes of the decoding target area are associated with the geometry (Method 2). The decoding target area is an area corresponding to a decoding target slice (an area in which points corresponding to nodes belonging to the slice are located).

For example, an information processing method includes decoding encoded data in which a difference value between attribute data and a prediction value of the attribute data has been encoded, of a processing target node of a tree structure in which attribute data of each point of a point cloud expressing an object having a three-dimensional shape as a set of points is a node and slices serving as node groups that can be encoded independently of each other are formed, to derive the difference value of the processing target node; executing a nearby point search for setting a reference point to be referred to when deriving the prediction value of the processing target node only for a node decoded earlier than the processing target node among the nodes of the tree structure; restoring the attribute data of the processing target node by adding the derived difference value to the prediction value derived by using the attribute data of the reference point set through the nearby point search; and associating the restored attribute data of the point in a decoding target area with the geometry data of the point.

For example, an information processing apparatus includes: a decoding unit configured to decode encoded data in which a difference value between attribute data and a prediction value of the attribute data has been encoded, of a processing target node of a tree structure in which attribute data of each point of a point cloud expressing an object having a three-dimensional shape as a set of points is a node and slices serving as node groups that can be encoded independently of each other are formed, to derive the difference value of the processing target node; a nearby point search unit configured to execute a nearby point search for setting a reference point to be referred to when deriving the prediction value of the processing target node only for a node decoded earlier than the processing target node by the decoding unit among the nodes of the tree structure; a restoration unit configured to restore the attribute data of the processing target node by adding the difference value derived by the decoding unit to the prediction value derived by using the attribute data of the reference point set through the nearby point search by the nearby point search unit; and an association unit configured to associate the attribute data of the point in a decoding target area restored by the restoration unit with the geometry data of the point.

By doing so, it is possible to associate the geometry data with the attribute data more reliably, and to generate the point cloud data more reliably.

<Removal after Association>

As illustrated in a second row from the top of the table in FIG. 11, geometry data of the non-decoding target area may also be included in the association, and then points in the non-decoding target area may be removed on the basis of the geometry (Method 2-1). Here, the non-decoding target area indicates an area in which points corresponding to nodes belonging to slices that are not decoding targets are located. In other words, the non-decoding target area indicates an area in which points corresponding to nodes belonging to the decoding target slice are not located. An area in which points corresponding to the nodes belonging to the decoding target slice are located is referred to as a decoding target area.

For example, as illustrated in a third row from the top of the table in FIG. 11, after the geometry data and the attribute data are associated with each other, that is, after the point cloud data is generated, the points in the non-decoding target area may be removed using the decoded geometry (Method 2-1-1).

For example, in the information processing apparatus, the association unit may associate the attribute data and the geometry data of all the points restored by the restoration unit with each other, and remove the points in the non-decoding target area among the points at which the attribute data and the geometry data are associated with each other.

Figure 12:
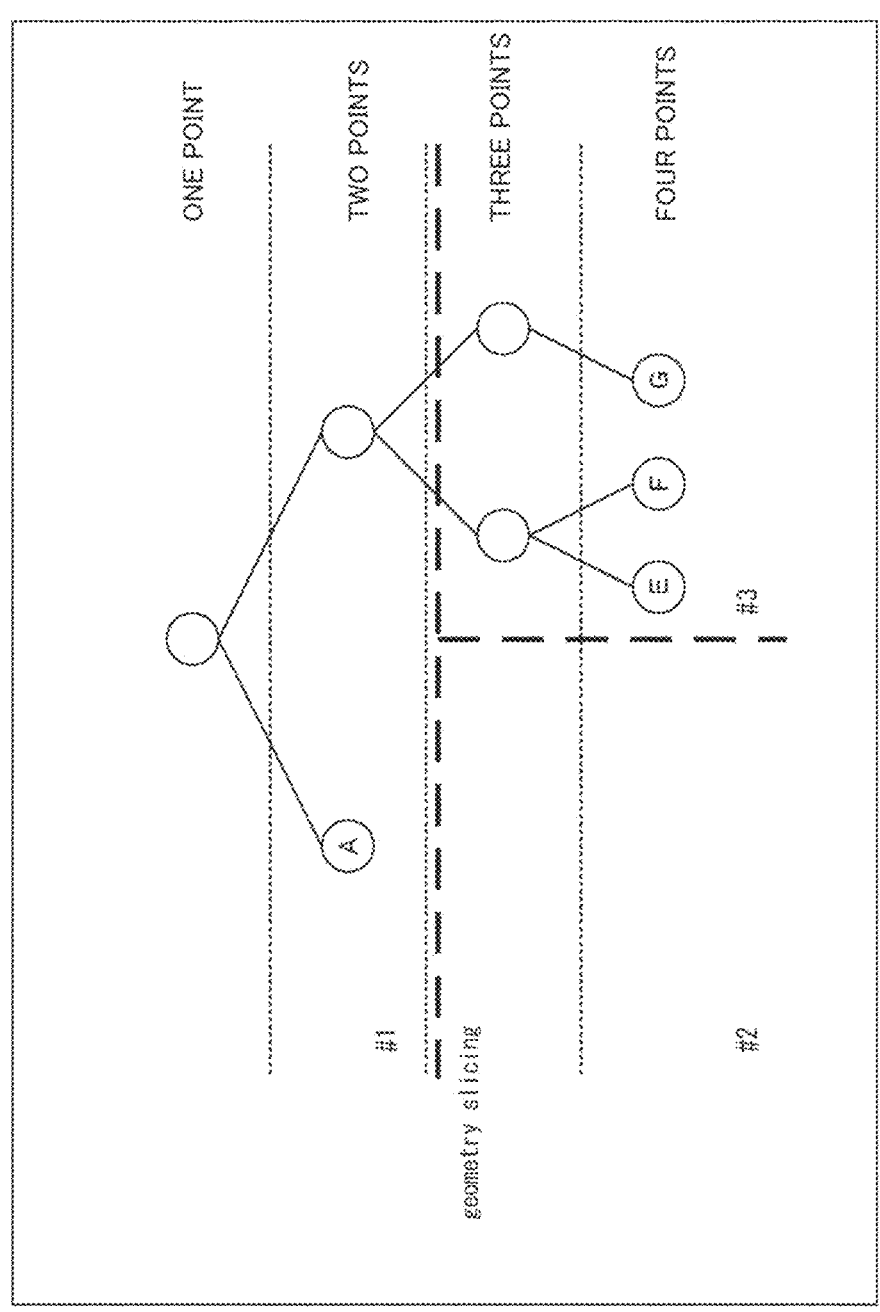
FIG. 12 is a diagram illustrating an example of an association method.

In this case, for example, the attribute data with decoded slice #4 and slice #6 as illustrated in FIG. 10 is associated with the geometry data also including node A, as illustrated in FIG. 12. By doing so, as illustrated in FIG. 12, since the numbers of pieces of geometry data and attribute data are the same even in the lower 2 LoDs, the geometry data and the attribute data can be associated with each other. After the association, it is possible to remove this node A by removing the points in the non-decoding target area on the basis of the geometry data.

That is, by doing so, only points in the decoding target area remain. Therefore, it is possible to associate the geometry data with the attribute data more reliably, and to generate the point cloud data more reliably.

<Removal Before Association>

As illustrated in a fourth row from the top of the table in FIG. 11, the attribute data of the non-decoding target area may be removed and then, the geometry data and the attribute data may be associated with each other (Method 2-2). For example, as shown at a bottom of the table in FIG. 11, the attribute data in the non-decoding target area may be removed using the geometry associated with the node at the time of LoD generation, and then, the geometry data and the attribute data may be associated with each other (Method 2-2-1).

For example, in the information processing apparatus, the association unit may remove the attribute data of the points in the non-decoding target area restored by the restoration unit, and associate the attribute data of the points in the decoding target area with the geometry data.

Figure 13:
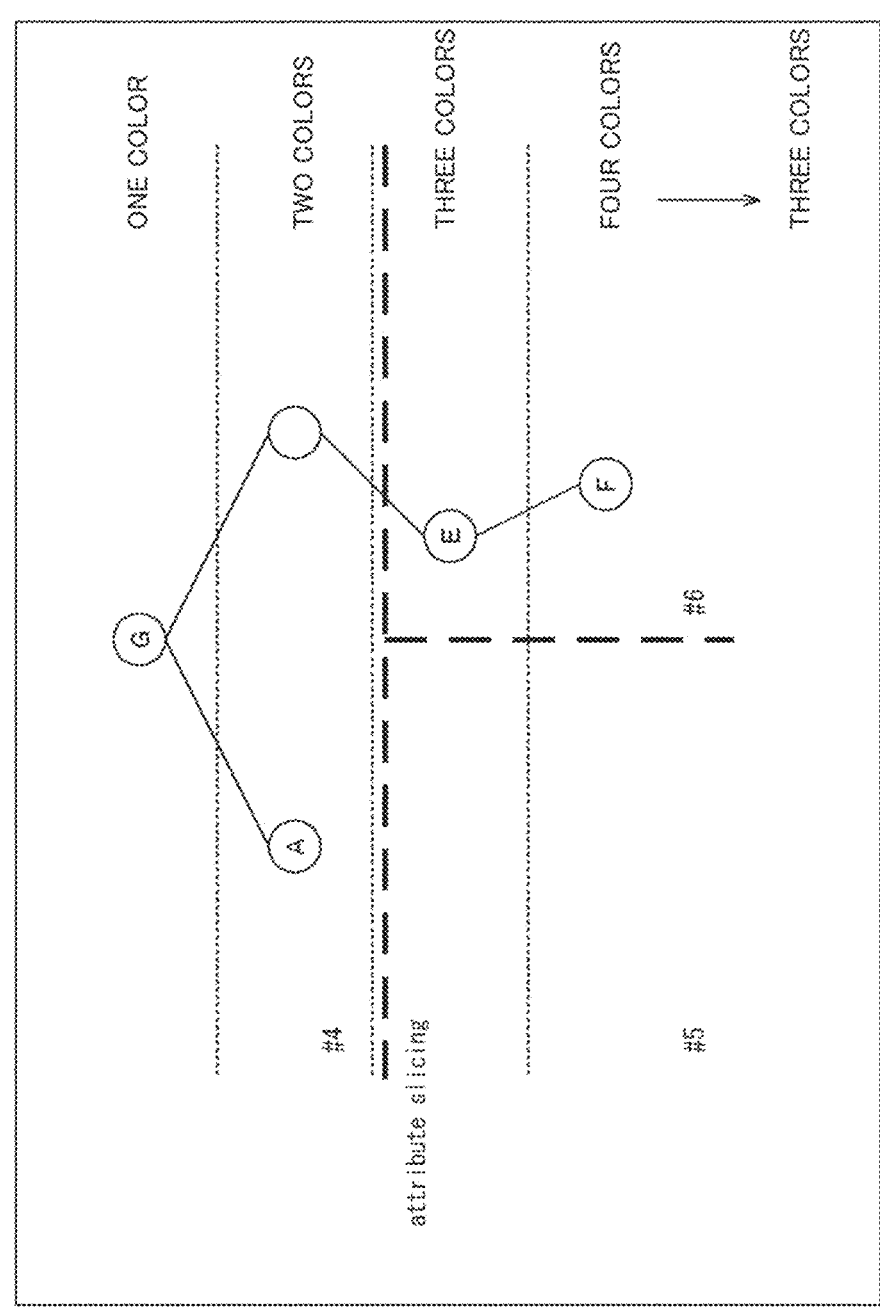
FIG. 13 is a diagram illustrating an example of an association method.

In this case, for example, the geometry is associated with each node of the attribute data when the tree structure of the attribute data is constructed. Geometry data with intermediate resolution (that is, geometry data of the same LoD) is associated with each node of the lowest LoD. Before the attribute data is associated with the geometry data (that is, point cloud data is generated), the attribute data of the point in the non-decoding target area is removed, as illustrated in FIG. 13, using the geometry of each node. In the case of the example of FIG. 13, node A is removed because the geometry of node A is located in the decoding target area. Accordingly, the lowest layer has three colors, and the number of the pieces of geometry data and the attribute data match.

Therefore, the geometry data and the attribute data can be associated with each other. That is, by doing so, it is possible to associate the geometry data with the attribute data more reliably, and to generate the point cloud data more reliably.

3. First Embodiment

<Encoding Apparatus>

Figure 14:
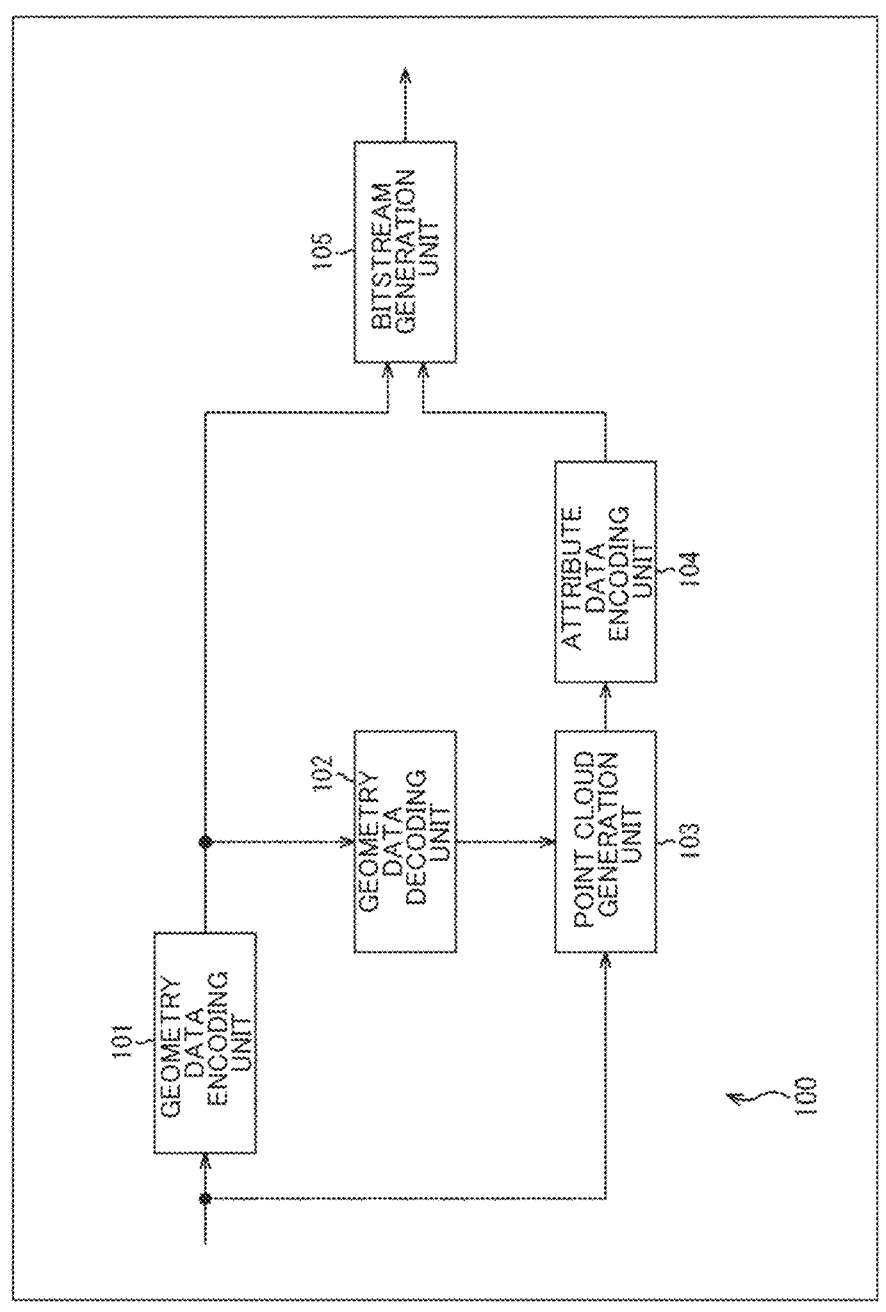
FIG. 14 is a block diagram illustrating a main configuration example of an encoding apparatus.

FIG. 14 is a block diagram illustrating an example of a configuration of an encoding apparatus that is an aspect of an information processing apparatus to which the present technology is applied. The encoding apparatus 100 illustrated in FIG. 14 is an apparatus that encodes a point cloud (3D data). The present technology (for example, various methods described with reference to FIGS. 1 to 13, or the like) can be applied to the encoding apparatus 100.

In FIG. 14, main components such as processing units or data flow are illustrated, and the components illustrated in FIG. 14 are not necessarily all. That is, in the encoding apparatus 100, there may be processing units not illustrated as blocks in FIG. 14, or there may be processes or data flows not illustrated as arrows or the like in FIG. 14.

As illustrated in FIG. 14, the encoding apparatus 100 includes a geometry data encoding unit 101, geometry data decoding unit 102, a point cloud generation unit 103, an attribute data encoding unit 104, and a bitstream generation unit 105.

The geometry data encoding unit 101 encodes position information of the point cloud (3D data) input to the encoding apparatus 100 to generate encoded geometry data. This encoding method is arbitrary. For example, processing such as filtering for noise suppression (denoise) or quantization may be performed. The geometry data encoding unit 101 supplies the generated encoded data to the geometry data decoding unit 102 and the bitstream generation unit 105.

The geometry data decoding unit 102 acquires the encoded data supplied from the geometry data encoding unit 101. The geometry data decoding unit 102 decodes the encoded data to generate the geometry data. This decoding method is arbitrary as long as the decoding method is a method corresponding to the encoding in the geometry data encoding unit 101. For example, processing such as filtering for denoising or inverse quantization may be performed. The geometry data decoding unit 102 supplies the generated geometry data (decoding result) to the point cloud generation unit 103.

The point cloud generation unit 103 acquires the point cloud attribute data input to the encoding apparatus 100, and the geometry data (decoding result) supplied from the geometry data decoding unit 102. The point cloud generation unit 103 performs processing (recoloring processing) for matching the attribute data with the geometry data (decoding result). The point cloud generation unit 103 supplies the attribute data associated with the geometry data (decoding result) to the attribute data encoding unit 104.

The attribute data encoding unit 104 acquires point cloud data (geometry data (decoding result) and attribute data) supplied from the point cloud generation unit 103. The attribute data encoding unit 104 encodes the attribute data using the geometry data (decoding result) to generate encoded data of the attribute data. The attribute data encoding unit 104 supplies the generated encoded data to the bitstream generation unit 105.

The bitstream generation unit 105 acquires the encoded data of the geometry data supplied from the geometry data encoding unit 101. Further, the bitstream generation unit 105 acquires the encoded data of the attribute data supplied from the attribute data encoding unit 104. The bitstream generation unit 105 multiplexes the encoded data to generate a bitstream including the encoded data. The bitstream generation unit 105 outputs the generated bitstream to the outside of the encoding apparatus 100. This bitstream is supplied to a decoding side device (for example, a decoding apparatus to be described below) via, for example, any communication medium or any storage medium.

In such an encoding apparatus 100, the present technology described above in <1. Restriction on Nearby Point Search> can be applied to the attribute data encoding unit 104. That is, in this case, the attribute data encoding unit 104 encodes the attribute data by using the method to which the present technology described above in <1. Restriction on Nearby Point Search> is applied.

With such a configuration, the encoding apparatus 100 can encode the attribute data so that the attribute data can be decoded independently for each slice. Therefore, it is possible to decode attribute data more reliably.

These processing units (the geometry data encoding unit 101 to the bitstream generation unit 105) have arbitrary configurations. For example, each processing unit may be configured of a logic circuit that realizes the above processing. Further, each processing unit may include, for example, a central processing unit (CPU), a read only memory (ROM), a random access memory (RAM), and the like, and execute a program using these to realize the above processing. Of course, each processing unit may have both the configurations to realize some of the above-described processing using a logic circuit, and realize others by executing a program. The configurations of the respective processing units may be independent of each other, and for example, some of the processing units may realize some of the above-described processing using a logic circuit, other processing units may realize the above-described processing by executing a program, and yet other processing units may realize the above-described processing using both the logic circuit and the execution of the program.

<Attribute Data Encoding Unit>

Figure 15:
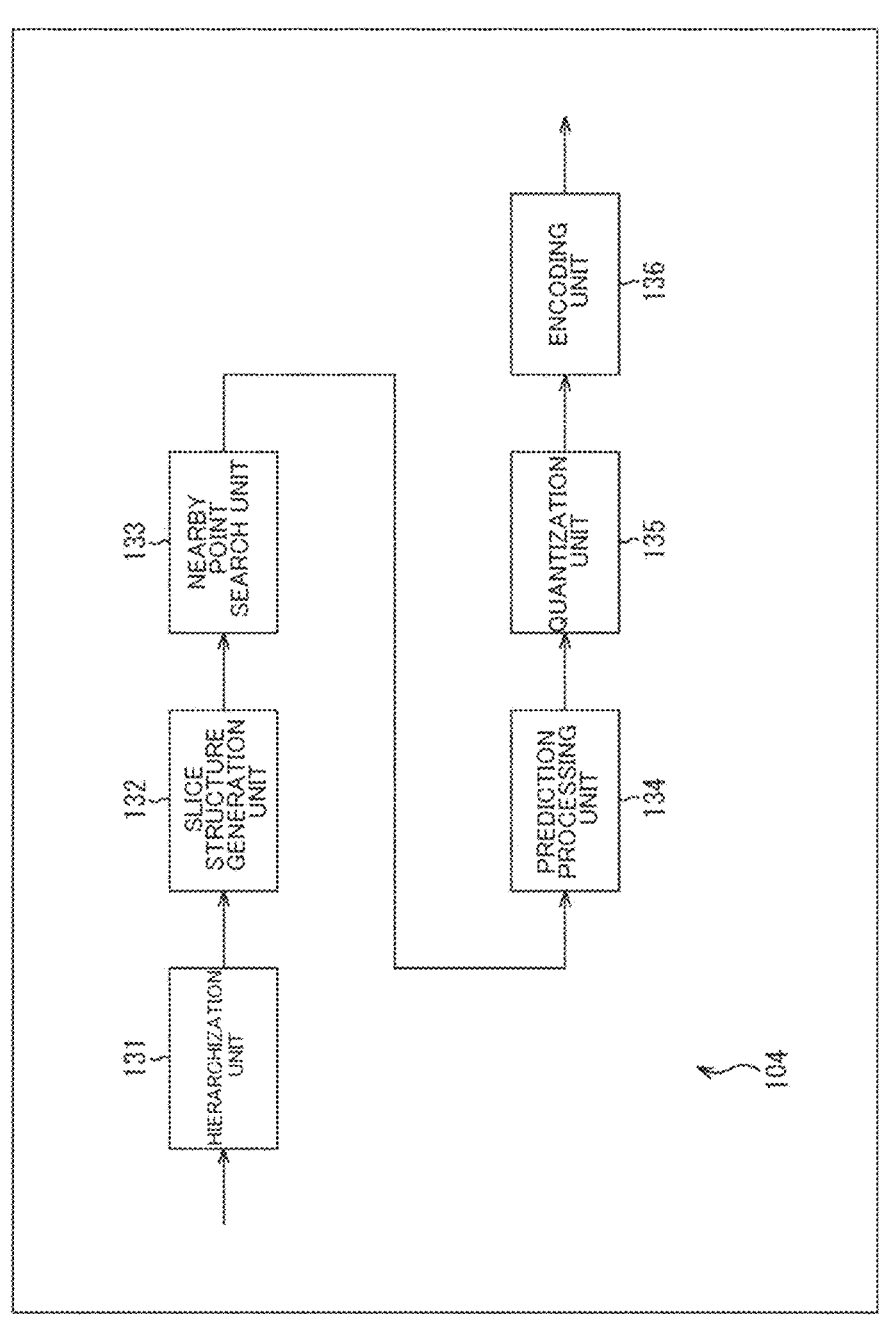
FIG. 15 is a block diagram illustrating a main configuration example of an attribute data encoding unit.

FIG. 15 is a block diagram illustrating a main configuration example of the attribute data encoding unit 104 (FIG. 14). In FIG. 15, main components such as processing units or data flow are illustrated, and the components illustrated in FIG. 15 are not necessarily all. That is, in the attribute data encoding unit 104, there may be processing units not illustrated as blocks in FIG. 15, or there may be processes or data flows not illustrated as arrows or the like in FIG. 15.

As illustrated in FIG. 15, the attribute data encoding unit 104 includes a hierarchization unit 131, a slice structure generation unit 132, a nearby point search unit 133, a prediction processing unit 134, a quantization unit 135, and an encoding unit 136.

The hierarchization unit 131 executes processing regarding hierarchization of attribute data (LoD Generation). For example, the hierarchization unit 131 acquires the attribute data and the geometry data (decoding result) supplied from the point cloud generation unit 103. The hierarchization unit 131 hierarchizes the attribute data using the geometry data. For example, the hierarchization unit 131 hierarchizes the attribute data to generate the same tree structure as that of the geometry data. The hierarchization unit 131 supplies the hierarchized attribute data to the slice structure generation unit 132 together with the geometry data.

The slice structure generation unit 132 executes processing regarding the generation of the slice structure. For example, the slice structure generation unit 132 acquires the attribute data and the geometry data supplied from the hierarchization unit 131. The slice structure generation unit 132 executes slicing on the attribute data to generate a slice structure. That is, the slice structure generation unit 132 groups the nodes of the tree structure of the attribute data to form a node group. In this case, the slice structure generation unit 132 perform the slicing so that each node is divided into areas, using the geometry data (that is, on the basis of the geometry of the points). For example, the slice structure generation unit 132 generates a slice structure of the attribute data in the same slice structure as the geometry data. The slice structure generation unit 132 supplies the attribute data for which the slice structure is generated, to the nearby point search unit 133 together with the geometry data.

The nearby point search unit 133 executes processing regarding the search for nearby points that refer to the attribute data in order to derive the prediction value of the processing target point. For example, the nearby point search unit 133 acquires the attribute data and the geometry data supplied from the slice structure generation unit 132. Further, the nearby point search unit 133 executes the nearby point search on the basis of the geometry data.

The nearby point search unit 133 executes the nearby point search by applying the present technology described above in <1. Restriction on Nearby Point Search>. For example, the nearby point search unit 133 may execute the nearby point search for setting the reference point to be referred to when deriving the prediction value of the attribute data of the processing target node, only for the node that is decoded earlier than the processing target node at the time of decoding among the nodes of the tree structure in which the attribute data of each point of the point cloud is a node and the slices serving as node groups that can be encoded independently of each other are formed, as described above in <Attribute Node Grouping>.

The tree structure of the attribute data may have, as a node, the attribute data of each point hierarchized on the basis of the geometry data. For example, the tree structure of the attribute data may have, as a node, the attribute data of each point hierarchized so that there is also a point at a voxel of one higher layer to which a voxel in which there is a point of a processing target layer belongs, on the basis of the geometry data. Further, the geometry data may form a hierarchized tree structure on the basis of geometry resolution, and each node of the tree structure of the attribute data may correspond to each node of the tree structure of the geometry data. Further, slices serving as node groups that can be encoded independently of each other are formed in the tree structure of the geometry data, and a structure of the slices formed in the tree structure of the attribute data may correspond to a structure of the slices formed in the tree structure of the geometry data.

Further, the nearby point search unit 133 may execute the nearby point search only for the nodes to be decoded earlier than the processing target node at the time of decoding among the nodes on the higher layer than the processing target node in the tree structure of the attribute data, as described above in <Inter Reference>.

As the nearby point search for the inter reference, the nearby point search unit 133 may execute the nearby point search only for nodes belonging to the same slice as the processing target node and on the higher layer than the processing target node decoded earlier than the processing target node at the time of decoding among the nodes of the tree structure of the attribute data, and nodes belonging to the slice decoded earlier than the slice to which the processing target node belongs at the time of decoding, as described above in <Nearby Point Search Target Restriction for Inter Reference Based on Slice Structure>.

Further, as the nearby point search for the inter reference, the nearby point search unit 133 may execute the nearby point search only for the ancestor nodes of the processing target node among the nodes of the tree structure of the attribute data, as described above in <Nearby Point Search Target Restriction for Inter Reference Based on Tree Structure>.

Further, the nearby point search unit 133 may execute the nearby point search only for nodes that are decoded earlier than the processing target node at the time of decoding among the nodes on the same layer as the processing target node in the tree structure of the attribute data, as described above in <Intra Reference>.

As the nearby point search for inter reference, the nearby point search unit 133 may execute the nearby point search only for nodes belonging to the same slice as the processing target node and on the same layer as the processing target node that is decoded earlier than the processing target node at the time of decoding among the nodes of the tree structure of the attribute data, as described above in <Nearby Point Search Target Restriction for Intra Reference Based on Slice Structure>.

The nearby point search unit 133 supplies a result of the search to the prediction processing unit 134 together with the attribute data and the geometry data.

The prediction processing unit 134 executes processing regarding prediction of the attribute data. For example, the prediction processing unit 134 acquires the search result of the nearby point search, the attribute data, and the geometry data supplied from the nearby point search unit 133. The prediction processing unit 134 derives the prediction value of the attribute data of the processing target node using the information. For example, the prediction processing unit 134 sets the nearby point that has been searched to the parent node or the grandparent node, and derives the prediction value of the attribute data of the processing target node using the attribute data of these nodes.

Further, the prediction processing unit 134 derives a difference value between the attribute data of the processing target node and the derived prediction value. The prediction processing unit 134 supplies the derived difference value to the quantization unit 135.

The quantization unit 135 acquires the difference value supplied from the prediction processing unit 134. The quantization unit 135 quantizes the difference value. The quantization unit 135 supplies the quantized difference value to the encoding unit 136.

The encoding unit 136 acquires the quantized difference value supplied from the quantization unit 135. The encoding unit 136 encodes the quantized difference value to generate encoded data of the attribute data (difference value). This encoding method is arbitrary. The encoding unit 136 supplies the generated encoded data to the bitstream generation unit 105 (FIG. 14).

As described above, the nearby point search unit 133 executes the nearby point search by applying the present technology, making it possible for the encoding apparatus 100 (the attribute data encoding unit 104) to encode the attribute data so that the attribute data can be independently decoded for each slice. Therefore, it is possible to decode attribute data more reliably.

These processing units (the hierarchization unit 131 to the encoding unit 136) have arbitrary configurations. For example, each processing unit may be configured by a logic circuit that realizes the above processing. Further, each processing unit may include, for example, a CPU, a ROM, a RAM, and the like, and may realize the above-described processing by executing a program using these. Of course, each processing unit may have both the configurations to realize some of the above-described processing using a logic circuit, and realize others by executing a program. The configurations of the respective processing units may be independent of each other, and for example, some of the processing units may realize some of the above-described processing using a logic circuit, other processing units may realize the above-described processing by executing a program, and yet other processing units may realize the above-described processing using both the logic circuit and the execution of the program.

<Flow of Encoding Processing>

Next, processing that is executed by this encoding apparatus 100 will be described. The encoding apparatus 100 encodes point cloud data by executing encoding processing. An example of the flow of the encoding processing will be described with reference to the flowchart of FIG. 16.

When the encoding processing is started, the geometry data encoding unit 101 of the encoding apparatus 100 encodes the input geometry data of the point cloud to generate the encoded data of the geometry data in step S101.

In step S102, the geometry data decoding unit 102 decodes the encoded data generated in step S101 to generate geometry data.

In step S103, the point cloud generation unit 103 performs the recoloring processing using the attribute data of the input point cloud and the geometry data (decoding result) generated in step S102 to associate the attribute data with the geometry data.

In step S104, the attribute data encoding unit 104 executes attribute data encoding processing to encode the attribute data recolored in step S103 and generate encoded data of attribute data.

In step S105, the bitstream generation unit 105 generates and outputs a bitstream including the encoded data of the geometry data generated in step S101 and the encoded data of the attribute data generated in step S104.

When the processing of step S105 ends, the encoding processing ends.

The present technology described above in <1. Restriction on Nearby Point Search> can be applied to the attribute data encoding processing executed in step S104 of such encoding processing. That is, in this case, the attribute data encoding unit 104 executes the attribute data encoding processing by using the method to which the present technology described above in <1. Restriction on Nearby Point Search> is applied, and encodes the attribute data.

By performing the processing of each step in this manner, the encoding apparatus 100 can encode the attribute data so that the attribute data can be decoded independently for each slice. Therefore, it is possible to decode attribute data more reliably.

<Flow of Attribute Data Encoding Processing>

Figure 16:
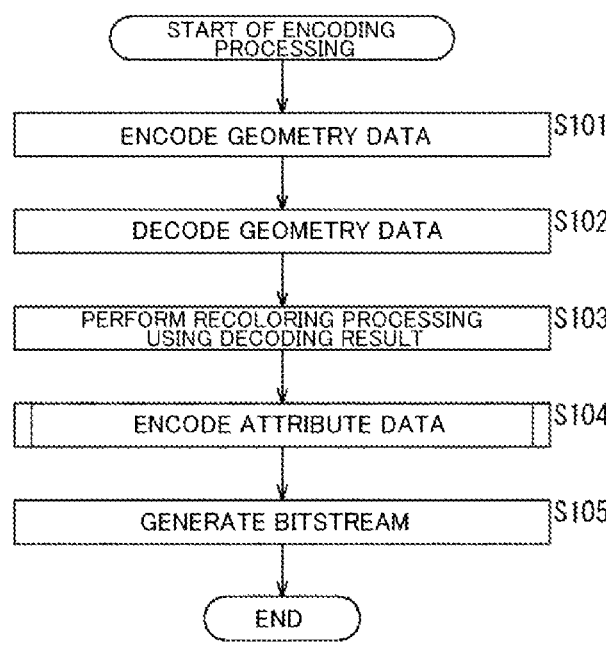
FIG. 16 is a flowchart illustrating an example of a flow of encoding processing.
Figure 17:
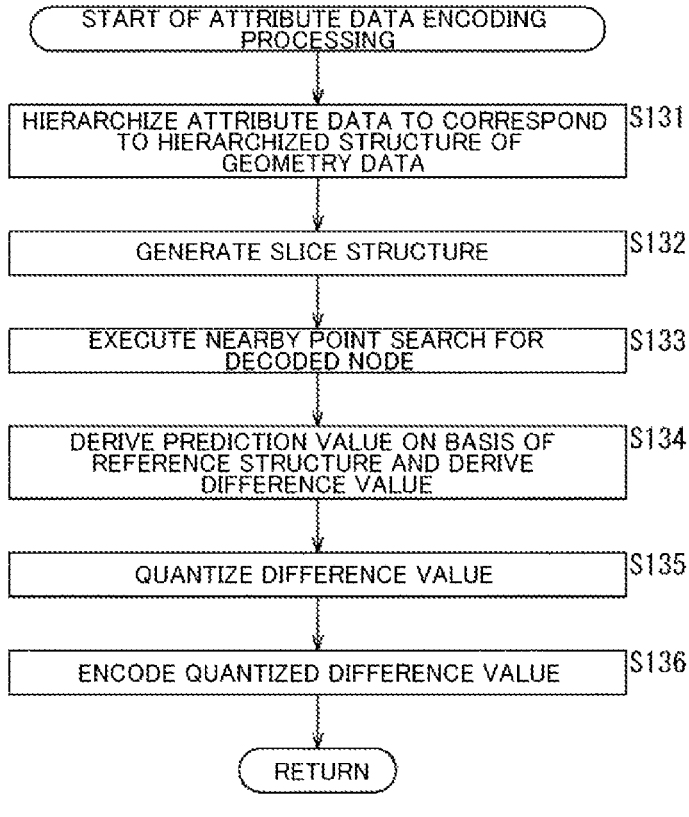
FIG. 17 is a flowchart illustrating an example of a flow of attribute data encoding processing.

Next, an example of a flow of the attribute data encoding processing executed in step S104 of FIG. 16 will be described with reference to the flowchart of FIG. 17.

When the attribute data encoding processing is started, the hierarchization unit 131 of the attribute data encoding unit 104 hierarchizes the attribute data to correspond to the hierarchized structure of the geometry data in step S131.

In step S132, the slice structure generation unit 132 generates the slice structure of the attribute data.

In step S133, the nearby point search unit 133 searches for nearby points that refer to the attribute data in order to derive the prediction value of the processing target point on the basis of the geometry data.

In this case, the nearby point search unit 133 executes the nearby point search by applying the present technology described above in <1. Restriction on Nearby Point Search>. For example, the nearby point search unit 133 may execute the nearby point search for setting the reference point to be referred to when deriving the prediction value of the attribute data of the processing target node, only for the node that is decoded earlier than the processing target node at the time of decoding among the nodes of the tree structure in which the attribute data of each point of the point cloud is a node and the slices serving as node groups that can be encoded independently of each other are formed, as described above in <Attribute Node Grouping>.

The tree structure of the attribute data may have, as a node, the attribute data of each point hierarchized on the basis of the geometry data. For example, the tree structure of the attribute data may have, as a node, the attribute data of each point hierarchized so that there is also a point at a voxel of one higher layer to which a voxel in which there is a point of a processing target layer belongs, on the basis of the geometry data. Further, the geometry data may form a hierarchized tree structure on the basis of geometry resolution, and each node of the tree structure of the attribute data may correspond to each node of the tree structure of the geometry data. Further, slices serving as node groups that can be encoded independently of each other are formed in the tree structure of the geometry data, and a structure of the slices formed in the tree structure of the attribute data may correspond to a structure of the slices formed in the tree structure of the geometry data.

Further, the nearby point search unit 133 may execute the nearby point search only for the nodes to be decoded earlier than the processing target node at the time of decoding among the nodes on the higher layer than the processing target node in the tree structure of the attribute data, as described above in <Inter Reference>.

As the nearby point search for the inter reference, the nearby point search unit 133 may execute the nearby point search only for nodes belonging to the same slice as the processing target node and on the higher layer than the processing target node decoded earlier than the processing target node at the time of decoding among the nodes of the tree structure of the attribute data, and nodes belonging to the slice decoded earlier than the slice to which the processing target node belongs at the time of decoding, as described above in <Nearby Point Search Target Restriction for Inter Reference Based on Slice Structure>.

Further, as the nearby point search for the inter reference, the nearby point search unit 133 may execute the nearby point search only for the ancestor nodes of the processing target node among the nodes of the tree structure of the attribute data, as described above in <Nearby Point Search Target Restriction for Inter Reference Based on Tree Structure>.

Further, the nearby point search unit 133 may execute the nearby point search only for nodes that are decoded earlier than the processing target node at the time of decoding among the nodes on the same layer as the processing target node in the tree structure of the attribute data, as described above in <Intra Reference>.

As the nearby point search for inter reference, the nearby point search unit 133 may execute the nearby point search only for nodes belonging to the same slice as the processing target node and on the same layer as the processing target node that is decoded earlier than the processing target node at the time of decoding among the nodes of the tree structure of the attribute data, as described above in <Nearby Point Search Target Restriction for Intra Reference Based on Slice Structure>.

In step S134, the prediction processing unit 134 derives a prediction value of the attribute data of the processing target node on the basis of the reference structure between nodes corresponding to the result of the nearby point search in step S133, and derives a difference value between the attribute data and the prediction value.

In step S135, the quantization unit 135 quantizes the difference value derived in step S134.

In step S136, the encoding unit 136 encodes the difference value quantized in step S135.

When the processing of step S136 ends, the attribute data encoding processing ends.

By performing the processing of each step in this manner, the encoding apparatus 100 (the attribute data encoding unit 104) can encode the attribute data so that the attribute data can be decoded independently for each slice. Therefore, it is possible to decode attribute data more reliably.

4. Second Embodiment

<Decoding Apparatus>

Figure 18:
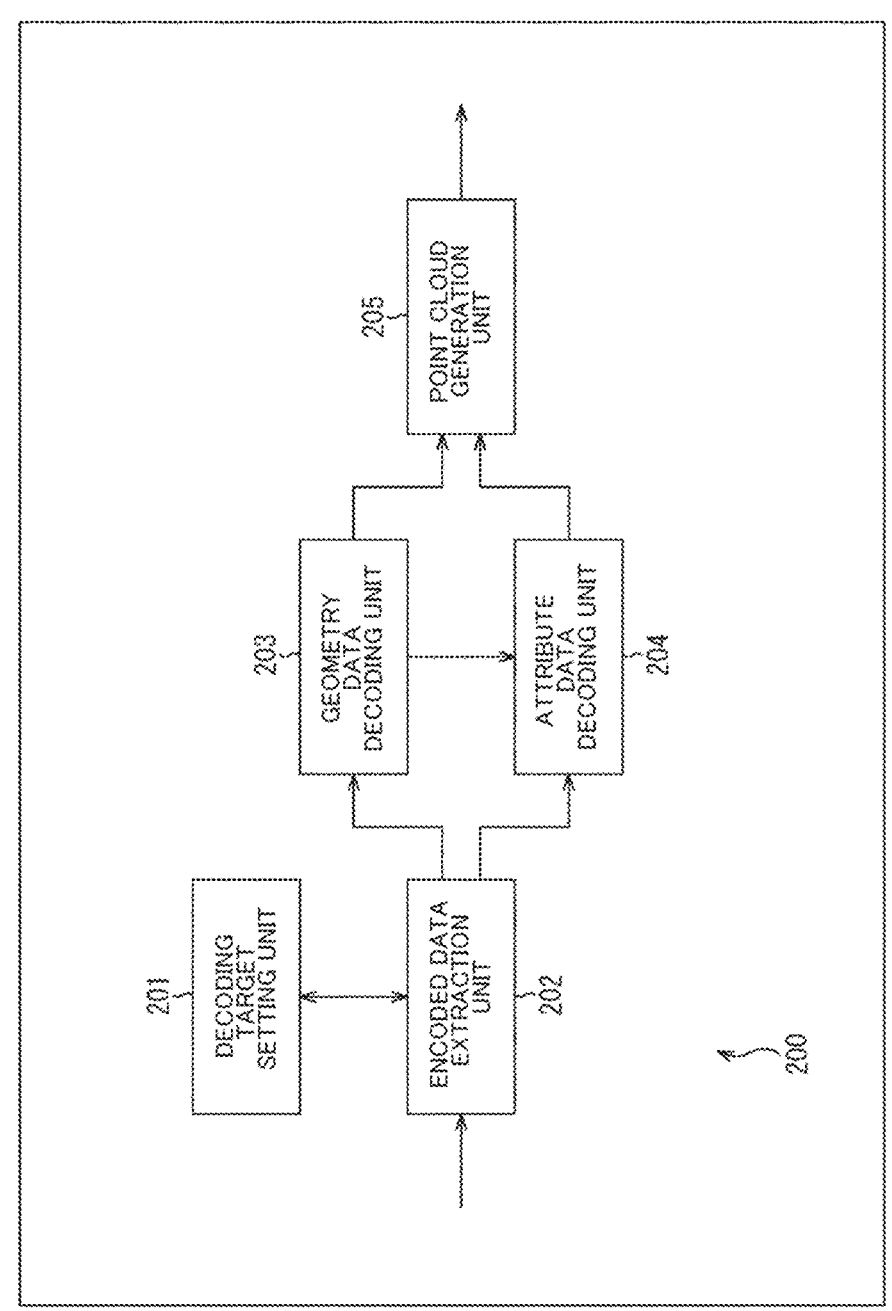
FIG. 18 is a block diagram illustrating a main configuration example of a decoding apparatus.

FIG. 18 is a block diagram illustrating an example of a configuration of a decoding apparatus that is an aspect of an information processing apparatus to which the present technology is applied. The decoding apparatus 200 illustrated in FIG. 18 is an apparatus that decodes encoded data of a point cloud (3D data). The present technology (for example, various methods described with reference to FIGS. 1 to 13) can be applied to the decoding apparatus 200.

In FIG. 18, main components such as processing units or data flow are illustrated, and the components illustrated in FIG. 18 are not necessarily all. That is, in the decoding apparatus 200, there may be processing units not illustrated as blocks in FIG. 18, or there may be processes or data flows not illustrated as arrows or the like in FIG. 18.

As illustrated in FIG. 18, the decoding apparatus 200 includes a decoding target setting unit 201, an encoded data extraction unit 202, a geometry data decoding unit 203, an attribute data decoding unit 204, and a point cloud generation unit 205.

The decoding target setting unit 201 performs processing regarding setting of layers (LoD) or slices (node groups) that are decoding targets. For example, the decoding target setting unit 201 sets a layer or area that is a decoding target, such as up to which layer to decode and which slice to decode, for the encoded data of the point cloud held in the encoded data extraction unit 202. A method of setting the layer or slice that is a decoding target is arbitrary.

For example, the decoding target setting unit 201 may perform setting on the basis of an instruction regarding the layers or the slices supplied from the outside such as a user or an application. Further, the decoding target setting unit 201 may obtain and set the layer or slice that is a decoding target on the basis of arbitrary information such as an output image.

For example, the decoding target setting unit 201 may set the layer or slice that is a decoding target on the basis of a viewpoint position, direction, angle of view, motion (movement, pan, tilt, or zoom) of the viewpoint, or the like of a two-dimensional image generated from the point cloud.

A data unit for setting of the decoding target is arbitrary. For example, the decoding target setting unit 201 can also set layers or slices for the entire point cloud. The decoding target setting unit 201 can also set layers or slices for each object. Further, the decoding target setting unit 201 can also set layers or slices for each partial area in the object. Of course, the layers or slices can also be set for a data unit other than these examples.

The encoded data extraction unit 202 acquires and holds the bitstream that is input to the decoding apparatus 200. The encoded data extraction unit 202 extracts the encoded data of the geometry data and the attribute data corresponding to a decoding target range designated by the decoding target setting unit 201 from the held bitstream. The encoded data extraction unit 202 supplies the extracted encoded data of the geometry data to the geometry data decoding unit 203. The encoded data extraction unit 202 supplies the extracted encoded data of the attribute data to the attribute data decoding unit 204.

The geometry data decoding unit 203 acquires the encoded data of the geometry data supplied from the encoded data extraction unit 202. The geometry data decoding unit 203 decodes the encoded data to generate geometry data (decoding result). This decoding method may be any method as long as the decoding method is the same method as in the geometry data decoding unit 102 of the encoding apparatus 100. The geometry data decoding unit 203 supplies the generated geometry data (decoding result) to the attribute data decoding unit 204 and the point cloud generation unit 205.

The attribute data decoding unit 204 acquires the encoded data of the attribute data supplied from the encoded data extraction unit 202. The attribute data decoding unit 204 acquires the geometry data (decoding result) supplied from the geometry data decoding unit 203. The attribute data decoding unit 204 decodes the encoded data using the geometry data (decoding result) to generate attribute data (decoding result). The attribute data decoding unit 204 supplies the generated attribute data (decoding result) to the point cloud generation unit 205.

The point cloud generation unit 205 acquires the geometry data (decoding result) supplied from the geometry data decoding unit 203. The point cloud generation unit 205 acquires the attribute data (decoding result) supplied from the attribute data decoding unit 204. The point cloud generation unit 205 associates the geometry data (decoding result) with the attribute data (decoding result) to generate point cloud data (decoding result). The point cloud generation unit 205 outputs the generated point cloud data (decoding result) to the outside of the decoding apparatus 200.

In such decoding apparatus 200, the present technology described above in <1. Restriction on Nearby Point Search> can be applied to the attribute data decoding unit 204. That is, in this case, the attribute data decoding unit 204 decodes the encoded data of the attribute data by using a method to which the present technology described above in <1. Restriction on Nearby Point Search> is applied.

With such a configuration, the decoding apparatus 200 can encode the attribute data so that the attribute data can be independently decoded for each slice. Therefore, it is possible to decode attribute data more reliably.

Further, the present technology described above in <2. Restriction on Association> can be applied to the point cloud generation unit 205. That is, in this case, the point cloud generation unit 205 generates point cloud data by using a method to which the present technology described above in <2. Restriction on Association> is applied.

For example, the point cloud generation unit 205 may associate the attribute data of the points in the decoding target area restored by the attribute data decoding unit 204 (a restoration unit 236 to be described below) with the geometry data of the point, as described above in <Association Restriction based on Slice Structure>.

Further, the point cloud generation unit 205 may associate the attribute data of all points restored by the attribute data decoding unit 204 (the restoration unit 236 described below) with the geometry data, and remove the points in the non-decoding target area among the points at which the attribute data and the geometry data are associated with each other, as described above in <Removal after Association>.

Further, the point cloud generation unit 205 may remove the attribute data of the points in the non-decoding target area restored by the attribute data decoding unit 204 (the restoration unit 236 described below), and associate the attribute data and the geometry data of the points in the decoding target area with each other, as described above in <Removal after Association>.

With such a configuration, the decoding apparatus 200 can associate the geometry data with the attribute data. That is, by doing so, it is possible to associate the geometry data with the attribute data more reliably, and to generate the point cloud data more reliably.

These processing units (the decoding target setting unit 201 to the point cloud generation unit 205) have arbitrary configurations. For example, each processing unit may be configured by a logic circuit that realizes the above processing. Further, each processing unit may include, for example, a CPU, a ROM, and a RAM, and realize the above-described processing by executing a program using these. Of course, each processing unit may have both the configurations, realize some of the above-described processes using a logic circuit, and realize others by executing a program. The configurations of the respective processing units may be independent of each other, and for example, some of the processing units may realize some of the above-described processing using a logic circuit, other processing units may realize the above-described processing by executing a program, and yet other processing units may realize the above-described processing using both the logic circuit and the execution of the program.

<Attribute Data Decoding Unit>

Figure 19:
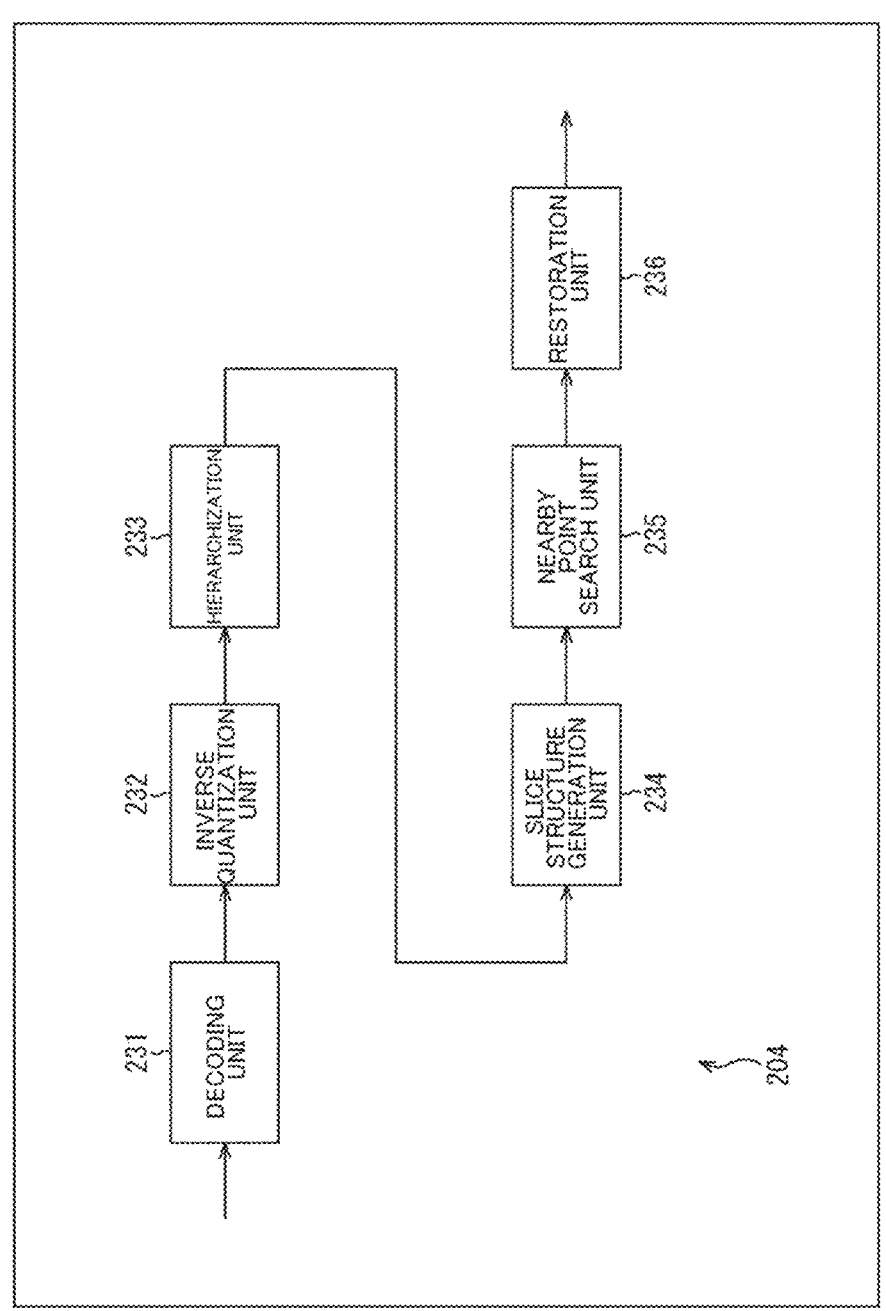
FIG. 19 is a block diagram illustrating a main configuration example of an attribute data decoding unit.

FIG. 19 is a block diagram illustrating a main configuration example of the attribute data decoding unit 204 (FIG. 18). In FIG. 19, main components such as processing units or data flow are illustrated, and the components illustrated in FIG. 19 are not necessarily all. That is, in the attribute data decoding unit 204, there may be processing units not illustrated as blocks in FIG. 19, or there may be processes or data flows not illustrated as arrows or the like in FIG. 19.

As illustrated in FIG. 19, the attribute data decoding unit 204 includes a decoding unit 231, an inverse quantization unit 232, a hierarchization unit 233, a slice structure generation unit 234, a nearby point search unit 235, and a restoration unit 236.

The decoding unit 231 executes processing regarding decoding. For example, the decoding unit 231 acquires the encoded data of the attribute data supplied from the encoded data extraction unit 202 (FIG. 18). The decoding unit 231 decodes the encoded data. By this decoding, the difference value between the attribute data and the prediction value thereof is obtained. This difference value is quantized. Further, this decoding method is arbitrary as long as the decoding method is a method corresponding to the encoding method in the encoding unit 136 (FIG. 15) of the encoding apparatus 100. The decoding unit 231 supplies the generated difference value (quantized difference value) to the inverse quantization unit 232.

The inverse quantization unit 232 acquires the quantized difference value supplied from the decoding unit 231. The inverse quantization unit 232 inversely quantizes the quantized difference value and derives the difference value. The inverse quantization unit 232 supplies the difference value to the hierarchization unit 233.

The hierarchization unit 233 acquires the difference value supplied from the inverse quantization unit 232. The hierarchization unit 233 hierarchizes the attribute data (converts the attribute data into a tree structure) on the basis of the geometry data supplied from the geometry data decoding unit 203. Accordingly, the hierarchization unit 233 forms the same tree structure for the attribute data as that of the encoding apparatus 100. The hierarchization unit 233 supplies the hierarchized difference values to the slice structure generation unit 234.

The slice structure generation unit 234 acquires the hierarchized difference values (attribute data) supplied from the hierarchization unit 233. The slice structure generation unit 234 performs slicing on the hierarchized difference values (attribute data) like the slice structure generation unit 132 to generate the slice structure. In this case, the slice structure generation unit 234 uses the geometry data (that is, on the basis of the geometry of the points) to perform the slicing so that each node is divided into areas. For example, the slice structure generation unit 234 generates a slice structure of the difference values (attribute data) in the same slice structure as the geometry data. The slice structure generation unit 234 supplies the difference value (attribute data) of which the slice structure has been generated, to the nearby point search unit 235 together with the geometry data.

The nearby point search unit 235 executes processing regarding the search for nearby points that refer to the attribute data in order to derive the prediction value of the processing target point. For example, the nearby point search unit 235 acquires the difference value (the attribute data) and the geometry data supplied from the slice structure generation unit 234. Further, the nearby point search unit 235 executes the nearby point search on the basis of the geometry data.

The nearby point search unit 235 applies the present technology described above <1. Restriction on Nearby Point Search> to execute the nearby point search. For example, the nearby point search unit 235 may execute the nearby point search for setting the reference point to be referred to when deriving the prediction value of the processing target node, only for the node that is decoded earlier than the processing target point by the decoding unit 231 among the nodes of the tree structure in which the attribute data of each point of the point cloud is a node and the slices serving as node groups that can be encoded independently of each other are formed, as described above in <Attribute Node Grouping>.

The tree structure of the attribute data may have, as a node, the attribute data of each point hierarchized on the basis of the geometry data. For example, the tree structure of the attribute data may have, as a node, the attribute data of each point hierarchized so that there is also a point at a voxel of one higher layer to which a voxel in which there is a point of a processing target layer belongs, on the basis of the geometry data. Further, the geometry data may form a hierarchized tree structure on the basis of geometry resolution, and each node of the tree structure of the attribute data may correspond to each node of the tree structure of the geometry data. Further, slices serving as node groups that can be encoded independently of each other are formed in the tree structure of the geometry data, and a structure of the slices formed in the tree structure of the attribute data may correspond to a structure of the slices formed in the tree structure of the geometry data.

By associating the tree structure of the attribute data with the tree structure of the geometry data in this way, it is possible to realize scalable decoding of the point cloud data. Further, it is possible to independently restore the point cloud data for each slice by associating the slice structure of the attribute data with the slice structure of the geometry data.

Further, the nearby point search unit 235 may execute nearby point search only for the node decoded earlier than the processing target node by the decoding unit 231, on the higher layer than the processing target node, among the nodes of the tree structure of the attribute data, as described above in <Inter Reference>.

As the nearby point search for the inter reference, the nearby point search unit 235 may execute the nearby point search only for nodes belonging to the same slice as the processing target node and on the higher layer than the processing target node decoded earlier than the processing target node by the decoding unit 231 among the nodes of the tree structure of the attribute data, as described above in <Nearby Point Search Target Restriction for Inter Reference Based on Slice Structure>, and nodes belonging to the slice decoded earlier than the slice to which the processing target node belongs by the decoding unit 231.

Further, as the nearby point search for the inter reference, the nearby point search unit 235 may execute the nearby point search only for the ancestor nodes of the processing target node among the nodes of the tree structure of the attribute data, as described above in <Nearby Point Search Target Restriction for Inter Reference Based on Tree Structure>.

Further, the nearby point search unit 235 may execute the nearby point search only for nodes decoded earlier than the processing target node by the decoding unit 231 among the nodes on the same layer as the processing target node in the tree structure of the attribute data, as described above in <Intra Reference>.

As the nearby point search for the inter reference, the nearby point search unit 235 may execute the nearby point search only for nodes belonging to the same slice as the processing target node and on the same layer as the processing target node decoded earlier than the processing target node by the decoding unit 231 among the nodes of the tree structure of the attribute data, as described above in <Nearby Point Search Target Restriction for Intra Reference Based on Slice Structure>.

The nearby point search unit 235 supplies the search result to the restoration unit 236 together with the attribute data and the geometry data.

The restoration unit 236 executes processing regarding restoration of the attribute data. For example, the restoration unit 236 acquires a search result of the nearby point search, the difference value (attribute data), and the geometry data supplied from the nearby point search unit 235. The restoration unit 236 derives the prediction value of the attribute data of the processing target node using the information. For example, the restoration unit 236 sets the nearby point that has been searched to the parent node or the grandparent node, and derives the prediction value of the attribute data of the processing target node using the attribute data of these nodes.

Further, the restoration unit 236 adds the derived prediction value to the difference value for the processing target node, and restores the attribute data. The restoration unit 236 supplies the derived attribute data to the point cloud generation unit 205.

As described above, the nearby point search unit 235 executes the nearby point search by applying the present technology, so that the decoding apparatus 200 (attribute data decoding unit 204) can independently decode the attribute data for each slice. Therefore, it is possible to decode attribute data more reliably.

These processing units (the decoding unit 231 to restoration unit 236) have arbitrary configurations. For example, each processing unit may be configured by a logic circuit that realizes the above processing. Further, each processing unit may include, for example, a CPU, a ROM, and a RAM, and realize the above-described processing by executing a program using these. Of course, each processing unit may have both the configurations, realize some of the above-described processes using a logic circuit, and realize others by executing a program. The configurations of the respective processing units may be independent of each other, and for example, some of the processing units may realize some of the above-described processing using a logic circuit, other processing units may realize the above-described processing by executing a program, and yet other processing units may realize the above-described processing using both the logic circuit and the execution of the program.

<Flow of Decoding Processing>

Next, processing executed by this decoding apparatus 200 will be described. The decoding apparatus 200 decodes the encoded data of the point cloud by executing decoding processing. An example of the flow of this decoding processing will be described with reference to a flowchart of FIG. 20.

When the decoding processing is started, the decoding target setting unit 201 of the decoding apparatus 200 sets LoD or slices that are decoding targets in step S201.

In step S202, the encoded data extraction unit 202 acquires and holds the bitstream, and extracts the encoded data of the geometry data and the attribute data (difference value) of the LoD or slice (that is, the decoding target) set in step S201.

In step S203, the geometry data decoding unit 203 decodes the encoded data extracted in step S202 to generate geometry data (decoding result).

In step S204, the attribute data decoding unit 204 decodes the encoded data extracted in step S202 by executing attribute data decoding processing, to generate a difference value (attribute data).

In step S205, the point cloud generation unit 205 executes point cloud generation processing, and associates the geometry data generated in step S203 with the difference value (attribute data) generated in step S204 to generate a point cloud (decoding result).

When the processing of step S205 ends, the decoding processing ends.

The present technology described above in <1. Restriction on Nearby Point Search> can be applied to the attribute data decoding processing executed in step S204 of such decoding processing. That is, in this case, the attribute data decoding unit 204 executes the attribute data decoding processing by using the method to which the present technology described above in <1. Restriction on Nearby Point Search> is applied, to decode the encoded data of the difference value (attribute data).

Further, the present technology described above in <2. Restrictions on Association> can be applied to the point cloud generation processing executed in step S205. That is, in this case, the point cloud generation unit 205 executes the point cloud generation processing by using the method to which the present technology described above in <1. Restriction on Nearby Point Search> is applied, associates the attribute data of the point in the restored decoding target area with the geometry data of the point, and generates the point cloud data.

The decoding apparatus 200 can independently decode the attribute data for each slice by performing the processing of each step in this way. Further, the decoding apparatus 200 can associate the geometry data and the attribute data with each other. Therefore, it is possible to decode attribute data more reliably.

<Flow of Attribute Data Decoding Processing>

Next, an example of a flow of attribute data decoding processing executed in step S204 of FIG. 20 will be described with reference to the flowchart of FIG. 21.

When the attribute data decoding processing is started, the decoding unit 231 of the attribute data decoding unit 204 decodes the encoded data of the attribute data (difference value) to generate the difference value in step S231. This difference value is quantized.

In step S232, the inverse quantization unit 232 inversely quantizes the quantized difference value obtained in step S231 to obtain the difference value.

In step S233, the hierarchization unit 233 hierarchizes the difference values (attribute data) obtained in step S232. For example, the hierarchization unit 233 hierarchizes the difference values to correspond to the hierarchical structure of the geometry data.

In step S234, the slice structure generation unit 234 executes the slicing for the difference value (attribute data) hierarchized in step S233, like the slice structure generation unit 132, to generate the slice structure. In this case, the slice structure generation unit 234 uses the geometry data (that is, on the basis of the geometry of the points) to perform the slicing so that each node is divided into areas. For example, the slice structure generation unit 234 generates the slice structure of the difference values (attribute data) in the same slice structure as the geometry data.

In step S235, the nearby point search unit 235 executes the search for nearby points that refer to the attribute data in order to derive the prediction value of the processing target point.

In this case, the nearby point search unit 235 applies the present technology described above <1. Restriction on Nearby Point Search> to execute the nearby point search. For example, the nearby point search unit 235 may execute the nearby point search for setting the reference point to be referred to when deriving the prediction value of the processing target node, only for the node that is decoded earlier than the processing target point by the decoding unit 231 among the nodes of the tree structure in which the attribute data of each point of the point cloud is a node and the slices serving as node groups that can be encoded independently of each other are formed, as described above in <Attribute Node Grouping>.

The tree structure of the attribute data may have, as a node, the attribute data of each point hierarchized on the basis of the geometry data. For example, the tree structure of the attribute data may have, as a node, the attribute data of each point hierarchized so that there is also a point at a voxel of one higher layer to which a voxel in which there is a point of a processing target layer belongs, on the basis of the geometry data. Further, the geometry data may form a hierarchized tree structure on the basis of geometry resolution, and each node of the tree structure of the attribute data may correspond to each node of the tree structure of the geometry data. Further, slices serving as node groups that can be encoded independently of each other are formed in the tree structure of the geometry data, and a structure of the slices formed in the tree structure of the attribute data may correspond to a structure of the slices formed in the tree structure of the geometry data.

Further, the nearby point search unit 235 may execute the nearby point search only for a node decoded earlier than the processing target node by the decoding unit 231 among the nodes on the higher layer than the processing target node, of the tree structure of the attribute data, as described above in <Inter Reference>.

As the nearby point search for the inter reference, the nearby point search unit 235 may execute the nearby point search only for nodes belonging to the same slice as the processing target node and on the higher layer than the processing target node decoded earlier than the processing target node by the decoding unit 231 among the nodes of the tree structure of the attribute data, as described above in <Nearby Point Search Target Restriction for Inter Reference Based on Slice Structure>, and nodes belonging to the slice decoded earlier than the slice to which the processing target node belongs by the decoding unit 231.

Further, as the nearby point search for the inter reference, the nearby point search unit 235 may execute the nearby point search only for the ancestor nodes of the processing target node among the nodes of the tree structure of the attribute data, as described above in <Nearby Point Search Target Restriction for Inter Reference Based on Tree Structure>.

Further, the nearby point search unit 235 may execute the nearby point search only for nodes decoded earlier than the processing target node by the decoding unit 231 among the nodes on the same layer as the processing target node in the tree structure of the attribute data, as described above in <Intra Reference>.

As the nearby point search for the inter reference, the nearby point search unit 235 may execute the nearby point search only for nodes belonging to the same slice as the processing target node and on the same layer as the processing target node decoded earlier than the processing target node by the decoding unit 231 among the nodes of the tree structure of the attribute data, as described above in <Nearby Point Search Target Restriction for Intra Reference Based on Slice Structure>.

In step S236, the restoration unit 236 uses the search result of the nearby point search executed in step S235, the difference value (attribute data) obtained in step S232, and the geometry data to derive the prediction value of the attribute data of the processing target node. For example, the restoration unit 236 sets the nearby point that has been searched to the parent node or the grandparent node, and derives the prediction value of the attribute data of the processing target node using the attribute data of these nodes. Further, the restoration unit 236 adds the derived prediction value to the difference value for the processing target node, and restores the attribute data.

When the processing of step S236 ends, the attribute data decoding processing ends.

The decoding apparatus 200 (attribute data decoding unit 204) can independently decode the attribute data for each slice by performing the processing of each step in this way. Therefore, it is possible to decode attribute data more reliably.

<Point Cloud Generation Process Flow 1>

Figure 22:
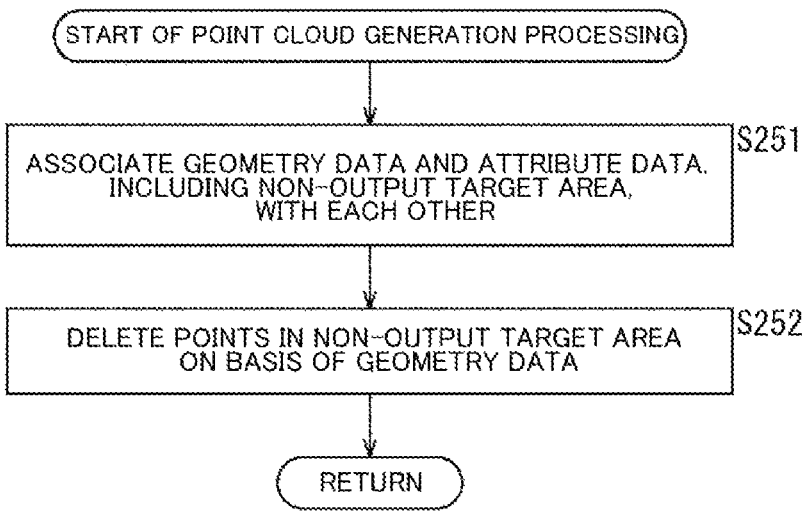
FIG. 22 is a flowchart illustrating an example of a flow of point cloud generation processing.

Next, an example of a flow of point cloud generation processing executed in step S205 of FIG. 20 will be described with reference to a flowchart of FIG. 22. This flowchart corresponds to the example described in <Removal after Association> of <2. Restriction of Association>.

When the point cloud generation processing is started, the point cloud generation unit 205 associates the geometry data and the attribute data, including a non-output target area in step S251, with each other.

In step S252, the point cloud generation unit 205 deletes points in the non-output target area on the basis of the geometry data.

Figure 20:
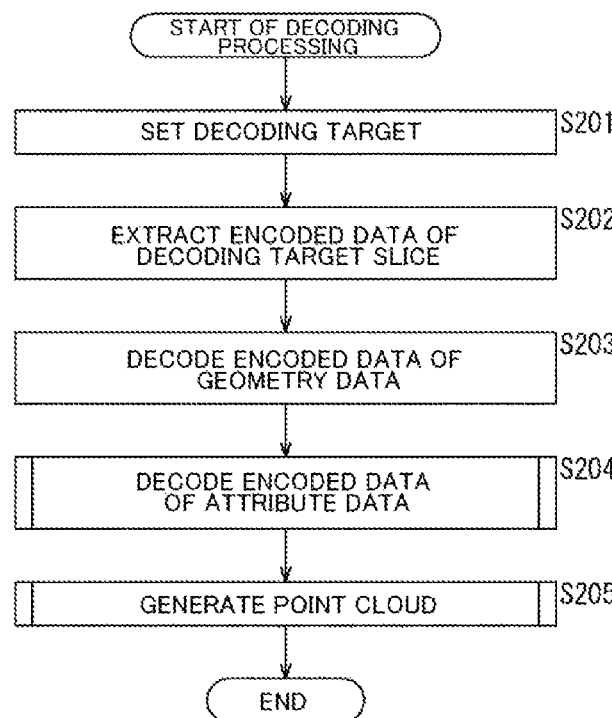
FIG. 20 is a flowchart describing an example of a flow of decoding processing.

When the processing of step S252 ends, the processing returns to FIG. 20.

By doing so, the point cloud generation unit 205 can remove the points in the non-decoding target area and leave the points in the decoding target area as described above in <Removal after Association>. Therefore, the decoding apparatus 200 (point cloud generation unit 205) can associate the geometry data with the attribute data more reliably, and generate the point cloud data more reliably.

<Point Cloud Generation Process Flow 2>

Figure 23:
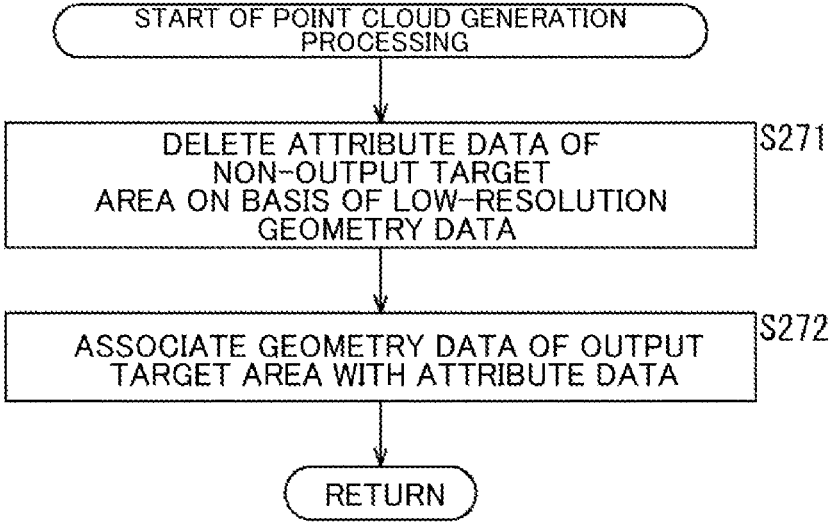
FIG. 23 is a flowchart illustrating an example of a flow of point cloud generation processing.

Next, another example of a flow of point cloud generation processing executed in step S205 of FIG. 20 will be described with reference to a flowchart of FIG. 23. This flowchart corresponds to the example described in <Removal before Association> of <2. Restriction on Association>.

When the point cloud generation processing is started, the point cloud generation unit 205 deletes the attribute data of the non-output target area on the basis of low-resolution geometry data in step S271.

In step S272, the point cloud generation unit 205 associates the geometry data of the output target area with the attribute data.

When the processing of step S272 ends, the processing returns to FIG. 20.

By doing so, the point cloud generation unit 205 can associate the geometry data and the attribute data with each other as described above in <Removal before Association>. That is, by doing so, the decoding apparatus 200 (point cloud generation unit 205) can associate the geometry data with the attribute data more reliably, and generate the point cloud data more reliably.

5. Supplements

<Computer>

The above-described series of processing can be executed by hardware or can be executed by software. When the series of processing is executed by software, a program that constitutes the software is installed in the computer. Here, the computer includes, for example, a computer built into dedicated hardware, or a general-purpose personal computer capable of executing various functions by various programs being installed.

Figure 24:
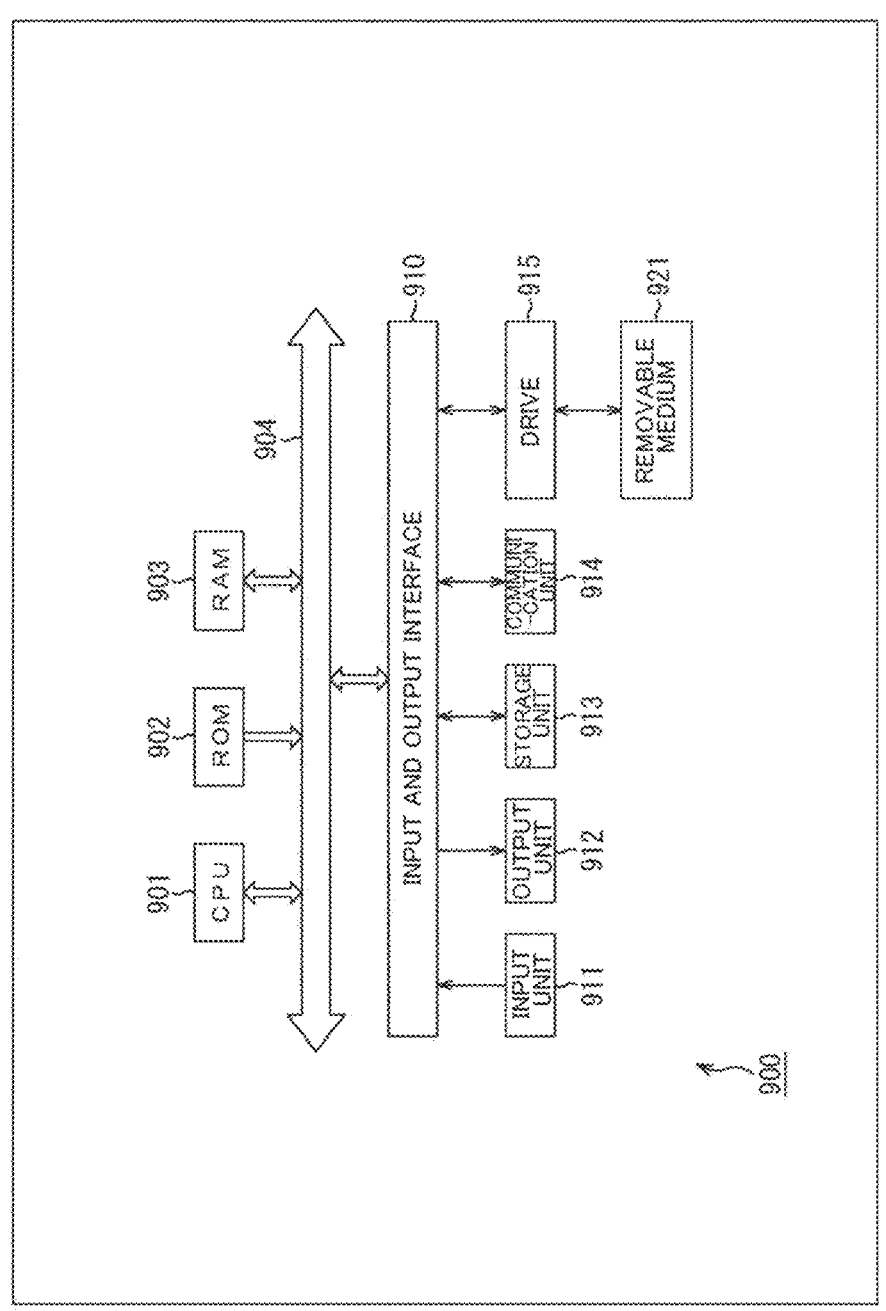
FIG. 24 is a block diagram illustrating a main configuration example of a computer.

FIG. 24 is a block diagram illustrating a configuration example of computer hardware that executes the above-described series of processing using a program.

In a computer 900 illustrated in FIG. 24, a central processing unit (CPU) 901, a read only memory (ROM) 902, and a random access memory (RAM) 903 are connected to each other via a bus 904.

An input and output interface 910 is also connected to the bus 904. An input unit 911, an output unit 912, a storage unit 913, a communication unit 914, and a drive 915 are connected to the input and output interface 910.

The input unit 911 includes, for example, a keyboard, a mouse, a microphone, a touch panel, or an input terminal. The output unit 912 includes, for example, a display, a speaker, or an output terminal. The storage unit 913 includes, for example, a hard disk, a RAM disk, or a non-volatile memory. The communication unit 914 includes, for example, a network interface. The drive 915 drives a removable medium 921 such as a magnetic disk, an optical disc, a magneto-optical disc, or a semiconductor memory.

In the computer configured as described above, the CPU 901 loads a program stored in the storage unit 913 into the RAM 903 via the input and output interface 910 and the bus 904 and executes the program, so that the above-described series of processing is performed. The RAM 903 also appropriately stores, for example, data necessary for the CPU 901 to execute various types of processing.

The program to be executed by the computer, for example, can be recorded on the removable medium 921 such as a package medium and applied. In this case, the program can be installed in the storage unit 913 via the input and output interface 910 by the removable medium 921 being mounted in the drive 915.

This program can also be provided via wired or wireless transfer medium such as a local area network, the Internet, and digital satellite broadcasting. In this case, the program can be received by the communication unit 914 and installed in the storage unit 913.

Alternatively, this program can be installed in the ROM 902 or the storage unit 913 in advance.

<Application Target of Present Technology>

Although a case in which the present technology is applied to encoding and decoding of the point cloud data has been described above, the present technology is not limited to these examples and can be applied to encoding and decoding of 3D data having any standard. For example, in encoding and decoding of mesh data, the mesh data may be converted into point cloud data, and encoding and decoding may be performed by applying the present technology. That is, specifications of various processing such as encoding and decoding methods and various types of data such as 3D data or metadata are arbitrary as long as these do not conflict with the present technology described above. Further, some of the processing or specifications described above may be omitted as long as this does not conflict with the present technology.

The present technology can be applied to any configuration. For example, the present technology can be applied to various electronic devices such as a transmitter or a receiver (for example, a television receiver or a mobile phone) in satellite broadcasting, cable broadcasting such as a cable TV, distribution on the Internet, distribution to a terminal by cellular communication, or the like, or apparatuses (for example, a hard disk recorder or a camera) that record images on a medium such as an optical disc, a magnetic disk, and a flash memory, and reproduce the images from the storage medium.

Further, for example, the present technology can be implemented as a part of the configuration of the device, such as a processor (for example, a video processor) as a system large scale integration (LSI) or the like, a module (for example, a video module) using a plurality of processors or the like, a unit (for example, a video unit) using a plurality of modules or the like, or a set (for example, a video set) in which other functions are added to the unit.

Further, for example, the present technology can also be applied to a network system configured of a plurality of apparatuses. For example, the present technology may be implemented as cloud computing in which a plurality of apparatuses share processing and jointly perform processing via a network. For example, the present technology may be implemented in a cloud service in which a service regarding images (moving images) is provided to arbitrary terminals such as computers, audio visual (AV) device, portable information processing terminals, and Internet of Things (IoT) devices.

In the present specification, the system means a set of a plurality of components (apparatuses, modules (parts), and the like), and it does not matter whether all the components are present in the same housing. Therefore, a plurality of apparatuses housed in separate housings and connected via a network, and a single apparatus in which a plurality of modules are housed in one housing are both systems.

<Field and Use to which Present Technology can be Applied>

Systems, apparatuses, processing units, and the like to which the present technology are applied can be used in any field, such as transportation, medical care, crime prevention, agriculture, livestock industry, mining, beauty, factories, home appliances, weather, and nature monitoring. Further, the use thereof is arbitrary.

Others

Embodiments of the present technology are not limited to the above-described embodiments, and various changes can be made without departing from the gist of the present technology.

For example, a configuration described as one apparatus (or processing unit) may be divided and configured as a plurality of apparatuses (or processing units). On the other hand, the configuration described above as a plurality of apparatuses (or processing units) may be collectively configured as one apparatus (or processing unit). Further, of course, a configuration other than the above may be added to the configuration of each apparatus (or each processing unit). Further, a part of a configuration of an apparatus (or processing unit) may be included in a configuration of another apparatus (or another processing unit) as long as a configuration or operation of the system as a whole is substantially the same.

Further, for example, the above-described program may be executed in any apparatus. In this case, the apparatus only needs to have necessary functions (functional blocks, and the like) and to be able to obtain necessary information.

Further, for example, each step of one flowchart may be executed by one apparatus, or may be shared and executed by a plurality of apparatuses. Further, when a plurality of pieces of processing are included in one step, one apparatus may execute the plurality of pieces of processing, or the plurality of apparatuses may share and execute the plurality of pieces of processing. In other words, it is also possible to execute the plurality of pieces of processing included in one step as processing of a plurality of steps. On the other hand, it is also possible to execute processing described as a plurality of steps collectively as one step.

Further, for example, in a program that is executed by a computer, processing of steps describing the program may be executed in time series in an order described in the present specification, or may be executed in parallel or individually at a required timing such as when call is made. That is, the processing of the respective steps may be executed in an order different from the above-described order as long as there is no contradiction. Further, the processing of the steps describing this program may be executed in parallel with processing of another program, or may be executed in combination with the processing of the other program.

Further, for example, a plurality of technologies regarding the present technology can be independently implemented as a single body as long as there is no contradiction. Of course, it is also possible to perform any plurality of the present technologies in combination. For example, it is also possible to implement some or all of the present technologies described in any of the embodiments in combination with some or all of the present technologies described in other embodiments. Further, it is also possible to implement some or all of any of the present technologies described above in combination with other technologies not described above.

The present technology can also take the following configuration.

(1) An information processing apparatus including:
a nearby point search unit configured to execute a nearby point search for setting a reference point to be referred to when deriving a prediction value of attribute data of a processing target node, only for a node that is decoded earlier than the processing target node at the time of decoding among nodes of a tree structure in which attribute data of each point of a point cloud expressing an object having a three-dimensional shape as a set of points is a node and slices serving as node groups that can be encoded independently of each other are formed; and an encoding unit configured to encode a difference value between the attribute data of the processing target node and the prediction value derived by using the attribute data of the reference point set through the nearby point search by the nearby point search unit.

(2) The information processing apparatus according to (1), wherein the nearby point search unit executes the nearby point search only for the node to be decoded earlier than the processing target node at the time of decoding among the nodes on the higher layer than the processing target node in the tree structure.

(3) The information processing apparatus according to (2), wherein the nearby point search unit executes the nearby point search only for
the node belonging to the same slice as the processing target node and on the higher layer than the processing target node to be decoded earlier than the processing target node at the time of decoding, and
the node belonging to the slice to be decoded earlier than the slice to which the processing target node belongs at the time of decoding among the nodes of the tree structure.

(4) The information processing apparatus according to (2), wherein the nearby point search unit executes the nearby point search only for ancestor nodes of the processing target node among the nodes of the tree structure.

(5) The information processing apparatus according to (1), wherein the nearby point search unit executes the nearby point search only for the node to be decoded earlier than the processing target node at the time of decoding among the nodes on the same layer as the processing target node in the tree structure.

(6) The information processing apparatus according to (5), wherein the nearby point search unit executes the nearby point search only for the node belonging to the same slice as the processing target node and on the same layer as the processing target node to be decoded earlier than the processing target node at the time of decoding among the nodes of the tree structure.

(7) The information processing apparatus according to according to any one of (1) to (6), wherein the tree structure has, as the node, the attribute data of each point hierarchized on the basis of the geometry data.

(8) The information processing apparatus according to (7), wherein the tree structure has, as the node, the attribute data of each point hierarchized so that there is also a point at a voxel of one higher layer to which a voxel in which there is the point of a processing target layer belongs, on the basis of the geometry data.

(9) The information processing apparatus according to (8), wherein the geometry data forms a hierarchized tree structure on the basis of resolution of geometry, each node of the tree structure of the attribute data corresponds to a node of the tree structure of the geometry data, slices serving as node groups that can be encoded independently of each other are formed in the tree structure of the geometry data, and a structure of the slices formed in the tree structure of the attribute data corresponds to a structure of the slices formed in the tree structure of the geometry data.

(10) An information processing method including:

executing a nearby point search for setting a reference point to be referred to when deriving a prediction value of attribute data of a processing target node, only for a node that is decoded earlier than the processing target node at the time of decoding among nodes of a tree structure in which attribute data of each point of a point cloud expressing an object having a three-dimensional shape as a set of points is a node and slices serving as node groups that can be encoded independently of each other are formed; and encoding a difference value between the attribute data of the processing target node and the prediction value derived by using the attribute data of the reference point set through the nearby point search.

(11) An information processing apparatus including:

a decoding unit configured to decode encoded data in which a difference value between attribute data and a prediction value of the attribute data has been encoded, of a processing target node of a tree structure in which attribute data of each point of a point cloud expressing an object having a three-dimensional shape as a set of points is a node and slices serving as node groups that can be encoded independently of each other are formed, to derive the difference value of the processing target node;

a nearby point search unit configured to execute a nearby point search for setting a reference point to be referred to when deriving the prediction value of the processing target node only for a node decoded earlier than the processing target node by the decoding unit among the nodes of the tree structure;

a restoration unit configured to restore the attribute data of the processing target node by adding the difference value derived by the decoding unit to the prediction value derived by using the attribute data of the reference point set through the nearby point search by the nearby point search unit; and an association unit configured to associate the attribute data of the point in a decoding target area restored by the restoration unit with geometry data of the point.

(12) The information processing apparatus according to (11), wherein the nearby point search unit executes the nearby point search only for the node belonging to the same slice as the processing target node and on the higher layer than the processing target node decoded earlier than the processing target node by the decoding unit, and the node belonging to the slice decoded earlier than the slice to which the processing target node belongs by the decoding unit among the nodes of the tree structure.

(13) The information processing apparatus according to (11), wherein the nearby point search unit executes the nearby point search only for ancestor nodes of the processing target node among the nodes of the tree structure.

(14) The information processing apparatus according to (11), wherein the nearby point search unit executes the nearby point search only for the node belonging to the same slice as the processing target node and on the same layer as the processing target node decoded earlier than the processing target node by the decoding unit among the nodes of the tree structure.

(15) The information processing apparatus according to any one of (11) to (14), wherein the tree structure has, as a node, the attribute data of each point hierarchized on the basis of the geometry.

(16) The information processing apparatus according to (15), wherein the tree structure has, as the node, the attribute data of each point hierarchized so that there is also a point at a voxel of one higher layer to which a voxel in which there is the point of a processing target layer belongs, on the basis of the geometry data.

(17) The information processing apparatus according to (16), wherein the geometry data forms a hierarchized tree structure on the basis of resolution of geometry, each node of the tree structure of the attribute data corresponds to a node of the tree structure of the geometry data, slices serving as node groups that can be encoded independently of each other are formed in the tree structure of the geometry data, and a structure of the slices formed in the tree structure of the attribute data corresponds to a structure of the slices formed in the tree structure of the geometry data.

(18) The information processing apparatus according to (17), wherein the association unit associates the attribute data and the geometry data of all the points restored by the restoration unit with each other, and removes the points in a non-decoding target area at which the attribute data and the geometry data are associated with each other.

(19) The information processing apparatus according to (17), wherein the association unit removes the attribute data of the point in a non-decoding target area restored by the restoration unit, and associates the attribute data and the geometry data of the point in the decoding target area with each other.

(20) An information processing method including:

decoding encoded data in which a difference value between attribute data and a prediction value of the attribute data has been encoded, of a processing target node of a tree structure in which attribute data of each point of a point cloud expressing an object having a three-dimensional shape as a set of points is a node and slices serving as node groups that can be encoded independently of each other are formed, to derive the difference value of the processing target node; executing a nearby point search for setting a reference point to be referred to when deriving the prediction value of the processing target node only for a node decoded earlier than the processing target node among the nodes of the tree structure;

restoring the attribute data of the processing target node by adding the derived difference value to the prediction value derived by using the attribute data of the reference point set through the nearby point search; and

US 12,634,517 B2

35 associating the restored attribute data of the point in a
  decoding target area with the geometry data of the
  point.

<center>REFERENCE SIGNS LIST</center>

100 Encoding apparatus
101 Geometry data encoding unit
102 Geometry data decoding unit
103 Point cloud generation unit
104 Attribute data encoding unit
105 Bitstream generation unit
131 Hierarchization unit
132 Slice structure generation unit
133 Nearby point search unit
134 Prediction processing unit
135 Quantization unit
136 Encoding unit
200 Decoding apparatus
201 Decoding target setting unit
202 Encoded data extraction unit
203 Geometry data decoding unit
204 Attribute data decoding unit
205 Points cloud generation unit
231 Decoding unit
232 Inverse quantization unit
233 Hierarchization unit
234 Slice structure generation unit
235 Nearby point search unit
236 Restoration unit
900 Computer

The invention claimed is:

1. An encoding apparatus for a point cloud expressing a
three-dimensional object, the encoding apparatus compris-
ing:
  circuitry configured to
    hierarchize geometry data of the point cloud to have a
      tree structure,
    divide attribute data of the point cloud into a plurality
      of slices including a first slice and a second slice,
      each of which is decoded independently,
    specify each piece of the attribute data based on a
      corresponding node of the hierarchized geometry
      data of the point cloud,
    execute a nearby point search for setting a reference
      point for deriving a prediction value of a processing
      target of the attribute data, using the attribute data
      processed earlier than the processing target, and
    encode a difference value between the attribute data of
      the processing target and the prediction value,
  wherein the nearby point search includes an inter predic-
    tion for the processing target of the first slice, and
  wherein the circuitry is configured to exclude, from the
    inter prediction for the processing target of the first
    slice, the second slice that has no ancestor point which
    serves as the reference point for the processing target.

2. The encoding apparatus according to claim 1,
  wherein the plurality of slices further includes a third
    slice,
  wherein the third slice is processed earlier than the first
    slice and includes ancestor points for points in the first
    slice, and
  wherein the circuitry is further configured to execute the
    nearby point search only for ancestor points of the
    processing target in the first slice and in the third slice.

3. An encoding method for a point cloud expressing a
three-dimensional object, the encoding method comprising:

hierarchizing geometry data of the point cloud to have a
  tree structure;
dividing attribute data of the point cloud into a plurality
  of slices including a first slice and a second slice, each
  of which is decoded independently;
specifying each piece of the attribute data based on a
  corresponding node of the hierarchized geometry data
  of the point cloud;
executing a nearby point search for setting a reference
  point for deriving a prediction value of a processing
  target of the attribute data, using the attribute data
  processed earlier than the processing target; and
encoding a difference value between the attribute data of
  the processing target and the prediction value,
wherein the nearby point search includes an inter predic-
  tion for the processing target of the first slice,
wherein the second slice has no ancestor point which
  serves as the reference point for the processing target,
  and
wherein the second slice is excluded from the inter
  prediction for the processing target of the first slice.

4. The encoding method according to claim 3,
  wherein the plurality of slices further includes a third
    slice,
  wherein the third slice is processed earlier than the first
    slice and includes ancestor points for points in the first
    slice, and
  wherein the nearby point search is executed only for
    ancestor points of the processing target in the first slice
    and in the third slice.

5. A decoding apparatus for a point cloud expressing a
three-dimensional object, the decoding apparatus compris-
ing:
  circuitry configured to
    hierarchize geometry data of the point cloud to have a
      tree structure,
    divide attribute data of the point cloud into a plurality
      of slices including a first slice and a second slice,
    specify each piece of the attribute data based on a
      corresponding node of the hierarchized geometry
      data of the point cloud,
    execute a nearby point search for setting a reference
      point for deriving a prediction value of a processing
      target of the attribute data, using the attribute data
      processed earlier than the processing target, the
      nearby point search including an inter prediction for
      the processing target of the first slice, and
    decode a difference value between the attribute data of
      the processing target and the prediction value,
  wherein the circuitry is further configured to partially
    decode the first slice independently of the second slice,
  wherein the second slice has no ancestor point which
    serves as the reference point for the processing target,
    and
  wherein the second slice is excluded from the inter
    prediction for the processing target of the first slice.

6. The decoding apparatus according to claim 5,
  wherein the plurality of slices further includes a third
    slice,
  wherein the third slice is processed earlier than the first
    slice and includes ancestor points for points in the first
    slice, and
  wherein the circuitry is configured to execute the nearby
    point search only for ancestor points of the processing
    target in the first slice and in the third slice.

7. A decoding method for a point cloud expressing a
three-dimensional object, the decoding method comprising:

hierarchizing geometry data of the point cloud to have a tree structure;

dividing attribute data of the point cloud into a plurality of slices including a first slice and a second slice;

specifying each piece of the attribute data based on a corresponding node of the hierarchized geometry data of the point cloud;

executing a nearby point search for setting a reference point for deriving a prediction value of a processing target of the attribute data, using the attribute data processed earlier than the processing target, the nearby point search including an inter prediction for the processing target of the first slice; and decoding a difference value between the attribute data of the processing target and the prediction value, wherein the first slice is partially decoded independently of the second slice, wherein the second slice has no ancestor point which serves as the reference point for the processing target, and wherein the second slice is excluded from the inter prediction for the processing target of the first slice.

8. The decoding method according to claim 7, wherein the plurality of slices further includes a third slice, wherein the third slice is processed earlier than the first slice and includes ancestor points for points in the first slice, and wherein the nearby point search is executed only for ancestor points of the processing target in the first slice and in the third slice.

\* \* \* \* \*